United States Patent
Sun et al.

(10) Patent No.: US 11,546,924 B2
(45) Date of Patent: Jan. 3, 2023

(54) GROUP PHYSICAL CONTROL CHANNEL FOR AUTONOMOUS UPLINK TRANSMISSIONS

(71) Applicant: QUALCOMM Incorporated, San Diego, CA (US)

(72) Inventors: Jing Sun, San Diego, CA (US); Jing Jiang, San Diego, CA (US); Yang Yang, San Diego, CA (US); Chih Ping Li, San Diego, CA (US); Junyi Li, Chester, NJ (US); Chong Li, Weehawken, NJ (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/394,916

(22) Filed: Apr. 25, 2019

(65) Prior Publication Data

US 2019/0335480 A1 Oct. 31, 2019

Related U.S. Application Data

(60) Provisional application No. 62/664,053, filed on Apr. 27, 2018.

(51) Int. Cl.
*H04W 72/12* (2009.01)
*H04W 72/04* (2009.01)
(Continued)

(52) U.S. Cl.
CPC ......... *H04W 72/121* (2013.01); *H04L 1/1812* (2013.01); *H04L 5/0053* (2013.01);
(Continued)

(58) Field of Classification Search
CPC .................. H04W 72/121; H04W 72/1294
See application file for complete search history.

(56) References Cited

U.S. PATENT DOCUMENTS

| | | | |
|---|---|---|---|
| 2012/0028668 A1* | 2/2012 | Lee ................... | H04W 72/0486 455/509 |
| 2019/0141698 A1* | 5/2019 | Kim ..................... | H04L 5/001 |

(Continued)

OTHER PUBLICATIONS

Ericsson: "Channel Access Priority Classes for feLAA", 3GPP Draft; R2-1805723—Channel Access Priority Classes for feLAA, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), pp. 1-3, XP051429353, Retrieved from the Internet: URL: http://www.3gpp.org/ftp/Meetings_3GPP_SYNC/RAN2/Docs/ [retrieved on Apr. 14, 2018].

(Continued)

*Primary Examiner* — Ayaz R Sheikh
*Assistant Examiner* — Debebe A Asefa
(74) *Attorney, Agent, or Firm* — Holland & Hart LLP/Qualcomm Incorporated

(57) ABSTRACT

Methods, systems, and devices for wireless communications are described. A base station may transmit, and a user equipment (UE) may receive a group physical control channel signaling, which may configure grant uplink transmissions for a set of UEs including the receiving UE. The group physical control channel signaling may indicate allotted resources for configured grant uplink transmissions. The group physical control channel signaling may further indicate a group physical control channel which a UE may monitor for control messages. The UE may transmit a configured grant uplink transmission in accordance with the group physical control channel signaling. The base station may receive the configured grant uplink transmission and (Continued)

may determine a control message which it may transmit in the group physical control channel based on the configured grant uplink transmission. The UE may receive the control message, and may determine whether to retransmit a configured grant uplink transmission based thereon.

26 Claims, 17 Drawing Sheets

(51) Int. Cl.
    *H04W 76/11*     (2018.01)
    *H04L 5/00*     (2006.01)
    *H04L 1/18*     (2006.01)
    *H04W 72/14*     (2009.01)

(52) U.S. Cl.
    CPC ... *H04W 72/0413* (2013.01); *H04W 72/1268* (2013.01); *H04W 72/1289* (2013.01); *H04W 72/14* (2013.01); *H04W 76/11* (2018.02)

(56) References Cited

U.S. PATENT DOCUMENTS

| | | | |
|---|---|---|---|
| 2019/0349177 A1* | 11/2019 | Dinan | H04L 67/32 |
| 2019/0380125 A1* | 12/2019 | Yamamoto | H04L 5/0055 |
| 2020/0260417 A1* | 8/2020 | Jo | H04W 72/042 |
| 2020/0260442 A1* | 8/2020 | Yi | H04W 72/042 |
| 2020/0351872 A1* | 11/2020 | Cai | H04L 5/0094 |

OTHER PUBLICATIONS

Huawei., et al., "User Plane Aspects for NR-Based Access to Unlicensed Specturm", 3GPP Draft; R2-1805817 User Plane Aspects for NR-Based Access to Unlicensed Specturm, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), 4 Pages, XP051429435, Retrieved from the Internet: URL: http://www.3gpp.org/ftp/Meetings_3GPP_SYNC/RAN2/Docs/ [retrieved on Apr. 14, 2018].
Interdigital Inc: "On Explicit HARQ Feedback in DL for URLLC", 3GPP Draft; R1-1802628 On Explicit HARQ Feedback in DL for URLLC, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), 3 Pages, XP051398066, Retrieved from the Internet: URL: http://www.3gpp.org/ftp/tsg_ran/WG1_RL1/TSGR1_92/Docs/ [retrieved on Feb. 17, 2018].
International Search Report and Written Opinion—PCT/US2019/029452—ISA/EPO—dated Jun. 19, 2019 (183097WO).
Samsung: "Potential Physical Layer Procedures for NR-U", 3GPP Draft; R1-1804405 Phy Layer Procedure, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 7 Pages, XP051426690, Retrieved from the Internet: URL: http://www.3gpp.org/ftp/Meetings_3GPP_SYNC/RAN1/Docs/ [retrieved on Apr. 15, 2018].

\* cited by examiner

GROUP PHYSICAL CONTROL CHANNEL FOR AUTONOMOUS UPLINK TRANSMISSIONS

CROSS REFERENCES

The present application for patent claims the benefit of U.S. Provisional Patent Application No. 62/664,053 by SUN et al., entitled "GROUP PHYSICAL CONTROL CHANNEL FOR AUTONOMOUS UPLINK TRANSMISSIONS," filed Apr. 27, 2018, assigned to the assignee hereof, and expressly incorporated herein.

BACKGROUND

The following relates generally to wireless communications, and more specifically to group physical control channel for autonomous uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a base station may allocate resources for autonomous uplink (AUL) transmissions to a number of UEs concurrently and configure a UE to autonomously transmit uplink communications using the allocated resources. In AUL transmission schemes, a UE may transmit an AUL transmission without first receiving a grant from a base station to transmit the AUL transmission. In such cases, the base station may not know when a UE is going to transmit an AUL transmission, but rather a UE may autonomously determine when to transmit using the allocated resources. In some cases, UEs may be configured to retransmit an AUL transmission one or more times within the allocated resource, and such retransmissions may result in network congestion.

SUMMARY

The described techniques relate to improved methods, systems, devices, or apparatuses that support autonomous uplink (AUL) transmissions using shared radio frequency spectrum. Generally, the described techniques may provide for efficient control and administration of AUL transmissions. A base station may transmit, and a user equipment (UE) may receive, group physical control channel signaling. Such signaling may configure a group of UEs that includes the UE to perform AUL transmissions. The group physical control channel signaling may identify resources in which the UEs may transmit AUL transmissions. In some examples, the group physical control channel signaling, or other downlink signaling, may indicate to the UE a group physical control channel in which the base station may transmit control messages to the group of UEs for managing AUL transmissions.

At some time, the UE may determine to send an AUL transmission and transmit the AUL transmission in accordance with the group physical control channel signaling. The base station may receive the AUL transmission, and may make a determination about sending a control message to manage the AUL transmissions based on the received AUL transmission. For example, the base station may consider a current congestion level, successful or unsuccessful decoding of the AUL transmission, or detected collisions between multiple UEs transmitting AUL transmissions. To send a control message to a particular UE or multiple UEs, the base station may configure one or more UEs to monitor a particular field of the group physical control channel, and may send the control message in a particular field of the group physical control channel.

The UE may monitor the field of the group physical control channel indicated by the base station, and may receive a control message in that field. In some cases, the UE may determine whether to retransmit an AUL transmission based on the received control message. In some cases, the control message may include a deactivate message indicating that the AUL transmission resources are inactive, and the UE may halt subsequent AUL transmissions. Beneficially, the base station may use a group physical control channel to manage a set of UEs configured to send AUL transmissions in a manner that improves throughput and manages network congestion.

A method of wireless communication at a UE is described. The method may include receiving group physical control channel signaling that configures configured grant uplink transmissions for a set of UEs that includes the UE and transmitting a configured grant uplink transmission in accordance with the group physical control channel signaling.

An apparatus for wireless communication at a UE is described. The apparatus may include a processor, memory in electronic communication with the processor, and instructions stored in the memory. The instructions may be executable by the processor to cause the apparatus to receive group physical control channel signaling that configures configured grant uplink transmissions for a set of UEs that includes the UE and transmit a configured grant uplink transmission in accordance with the group physical control channel signaling.

Another apparatus for wireless communication at a UE is described. The apparatus may include means for receiving group physical control channel signaling that configures configured grant uplink transmissions for a set of UEs that includes the UE and transmitting a configured grant uplink transmission in accordance with the group physical control channel signaling.

A non-transitory computer-readable medium storing code for wireless communication at a UE is described. The code may include instructions executable by a processor to receive group physical control channel signaling that configures configured grant uplink transmissions for a set of UEs that includes the UE and transmit a configured grant uplink transmission in accordance with the group physical control channel signaling.

In some examples of the method, apparatuses, and non-transitory computer-readable medium described herein, the group physical control channel signaling indicates a group physical control channel.

Some examples of the method, apparatuses, and non-transitory computer-readable medium described herein may further include operations, features, means, or instructions for receiving a control message in the group physical control channel based on the configured grant uplink transmission.

Some examples of the method, apparatuses, and non-transitory computer-readable medium described herein may further include operations, features, means, or instructions for receiving an acknowledgment message in the group physical control channel based on the configured grant uplink transmission. Some examples of the method, apparatuses, and non-transitory computer-readable medium described herein may further include operations, features, means, or instructions for determining not to transmit a retransmission of the configured grant uplink transmission based on the acknowledgment message.

Some examples of the method, apparatuses, and non-transitory computer-readable medium described herein may further include operations, features, means, or instructions for receiving an activate message in the group physical control channel indicating that configured grant uplink transmission resources may be active.

Some examples of the method, apparatuses, and non-transitory computer-readable medium described herein may further include operations, features, means, or instructions for receiving a deactivate message in the group physical control channel indicating that configured grant uplink transmission resources may be inactive.

Some examples of the method, apparatuses, and non-transitory computer-readable medium described herein may further include operations, features, means, or instructions for receiving a suspend message in the group physical control channel indicating to suspend subsequent autonomous uplink transmissions.

Some examples of the method, apparatuses, and non-transitory computer-readable medium described herein may further include operations, features, means, or instructions for receiving a resume message in the group physical control channel indicating to resume autonomous uplink transmissions. Some examples of the method, apparatuses, and non-transitory computer-readable medium described herein may further include operations, features, means, or instructions for receiving a negative acknowledgment message in the group physical control channel based on the configured grant uplink transmission, and transmitting a retransmission of the configured grant uplink transmission based on the negative acknowledgment message.

Some examples of the method, apparatuses, and non-transitory computer-readable medium described herein may further include operations, features, means, or instructions for identifying a field within the group physical control channel based on the group physical control channel signaling.

Some examples of the method, apparatuses, and non-transitory computer-readable medium described herein may further include operations, features, means, or instructions for applying an input to a hash function to identify a field within the group physical control channel, and decoding the field to obtain a control message.

In some examples of the method, apparatuses, and non-transitory computer-readable medium described herein, the input may be a slot index associated with the configured grant uplink transmission, or a transmission time of the configured grant uplink transmission, or an identifier of the UE, or an identifier of a HARQ process, or any combination thereof.

Some examples of the method, apparatuses, and non-transitory computer-readable medium described herein may further include operations, features, means, or instructions for applying an identifier of a first HARQ process to a hash function to identify a first field within the group physical control channel, and applying an identifier of a second HARQ process to the hash function to identify a second field within the group physical control channel.

Some examples of the method, apparatuses, and non-transitory computer-readable medium described herein may further include operations, features, means, or instructions for receiving an acknowledgment message or a negative acknowledge message corresponding to the configured grant uplink transmission in the first field, and receiving the acknowledgment message or the negative acknowledge message in the second field corresponding to a second configured grant uplink transmission.

Some examples of the method, apparatuses, and non-transitory computer-readable medium described herein may further include operations, features, means, or instructions for receiving an ignore message in the group physical control channel indicating to ignore the group physical control channel.

A method of wireless communication at a base station is described. The method may include transmitting group physical control channel signaling that configures configured grant uplink transmissions for a set of user equipments (UEs) and receiving a configured grant uplink transmission in accordance with the group physical control channel signaling.

An apparatus for wireless communication at a base station is described. The apparatus may include a processor, memory in electronic communication with the processor, and instructions stored in the memory. The instructions may be executable by the processor to cause the apparatus to transmit group physical control channel signaling that configures configured grant uplink transmissions for a set of user equipments (UEs) and receive a configured grant uplink transmission in accordance with the group physical control channel signaling.

Another apparatus for wireless communication at a base station is described. The apparatus may include means for transmitting group physical control channel signaling that configures configured grant uplink transmissions for a set of user equipments (UEs) and receiving a configured grant uplink transmission in accordance with the group physical control channel signaling.

A non-transitory computer-readable medium storing code for wireless communication at a base station is described. The code may include instructions executable by a processor to transmit group physical control channel signaling that configures configured grant uplink transmissions for a set of user equipments (UEs) and receive a configured grant uplink transmission in accordance with the group physical control channel signaling.

In some examples of the method, apparatuses, and non-transitory computer-readable medium described herein, the group physical control channel signaling indicates a group physical control channel.

Some examples of the method, apparatuses, and non-transitory computer-readable medium described herein may further include operations, features, means, or instructions for transmitting a control message in the group physical control channel based on the configured grant uplink transmission.

Some examples of the method, apparatuses, and non-transitory computer-readable medium described herein may further include operations, features, means, or instructions for transmitting an acknowledgment message in the group physical control channel based on the configured grant uplink transmission.

Some examples of the method, apparatuses, and non-transitory computer-readable medium described herein may further include operations, features, means, or instructions for transmitting an activate message in the group physical control channel indicating that configured grant uplink transmission resources may be active.

Some examples of the method, apparatuses, and non-transitory computer-readable medium described herein may further include operations, features, means, or instructions for transmitting a deactivate message in the group physical control channel indicating that configured grant uplink transmission resources may be inactive.

Some examples of the method, apparatuses, and non-transitory computer-readable medium described herein may further include operations, features, means, or instructions for transmitting a suspend message in the group physical control channel indicating to suspend subsequent autonomous uplink transmissions.

Some examples of the method, apparatuses, and non-transitory computer-readable medium described herein may further include operations, features, means, or instructions for transmitting a resume message in the group physical control channel indicating to resume autonomous uplink transmissions.

Some examples of the method, apparatuses, and non-transitory computer-readable medium described herein may further include operations, features, means, or instructions for transmitting an ignore message in the group physical control channel indicating to ignore the group physical control channel.

Some examples of the method, apparatuses, and non-transitory computer-readable medium described herein may further include operations, features, means, or instructions for transmitting a negative acknowledgment message in the group physical control channel based on the configured grant uplink transmission, and receiving a retransmission of the configured grant uplink transmission based on the negative acknowledgment message.

Some examples of the method, apparatuses, and non-transitory computer-readable medium described herein may further include operations, features, means, or instructions for transmitting a control message in a field within the group physical control channel based on the group physical control channel signaling.

Some examples of the method, apparatuses, and non-transitory computer-readable medium described herein may further include operations, features, means, or instructions for applying an input to a hash function to identify a field within the group physical control channel, and transmitting a control message in the field.

In some examples of the method, apparatuses, and non-transitory computer-readable medium described herein, the input may be a slot index associated with the configured grant uplink transmission, or a transmission time of the configured grant uplink transmission, or an identifier of a UE, or an identifier of a HARQ process, or any combination thereof.

Some examples of the method, apparatuses, and non-transitory computer-readable medium described herein may further include operations, features, means, or instructions for applying an identifier of a first HARQ process to a hash function to identify a first field within the group physical control channel, and applying an identifier of a second HARQ process to the hash function to identify a second field within the group physical control channel.

Some examples of the method, apparatuses, and non-transitory computer-readable medium described herein may further include operations, features, means, or instructions for transmitting an acknowledgment message or a negative acknowledge message corresponding to the configured grant uplink transmission in the first field, and transmitting the acknowledgment message or the negative acknowledge message in the second field corresponding to a second configured grant uplink transmission.

Some examples of the method, apparatuses, and non-transitory computer-readable medium described herein may further include operations, features, means, or instructions for configuring a first UE of a set of UEs and a second UE of the set of UEs to monitor a field within the group physical control channel.

Some examples of the method, apparatuses, and non-transitory computer-readable medium described herein may further include operations, features, means, or instructions for receiving a second configured grant uplink transmission from the second UE within a time period in which the configured grant uplink transmission may be received from the first UE, determining that the field of the group physical control channel may be jointly assigned to provide feedback to each of the first UE and the second UE, and transmitting an acknowledgment message or a negative acknowledge message based on whether decoding of the configured grant uplink transmission and the second configured grant uplink transmission may be successful.

In some examples of the method, apparatuses, and non-transitory computer-readable medium described herein, the acknowledgment message may be transmitted if decoding of both of the autonomous uplink transmission and the second autonomous uplink transmission may be successful, and the negative acknowledgment message may be transmitted if decoding of either or both of the autonomous uplink transmission and the second autonomous uplink transmission may be unsuccessful.

DETAILED DESCRIPTION

Figure 1:
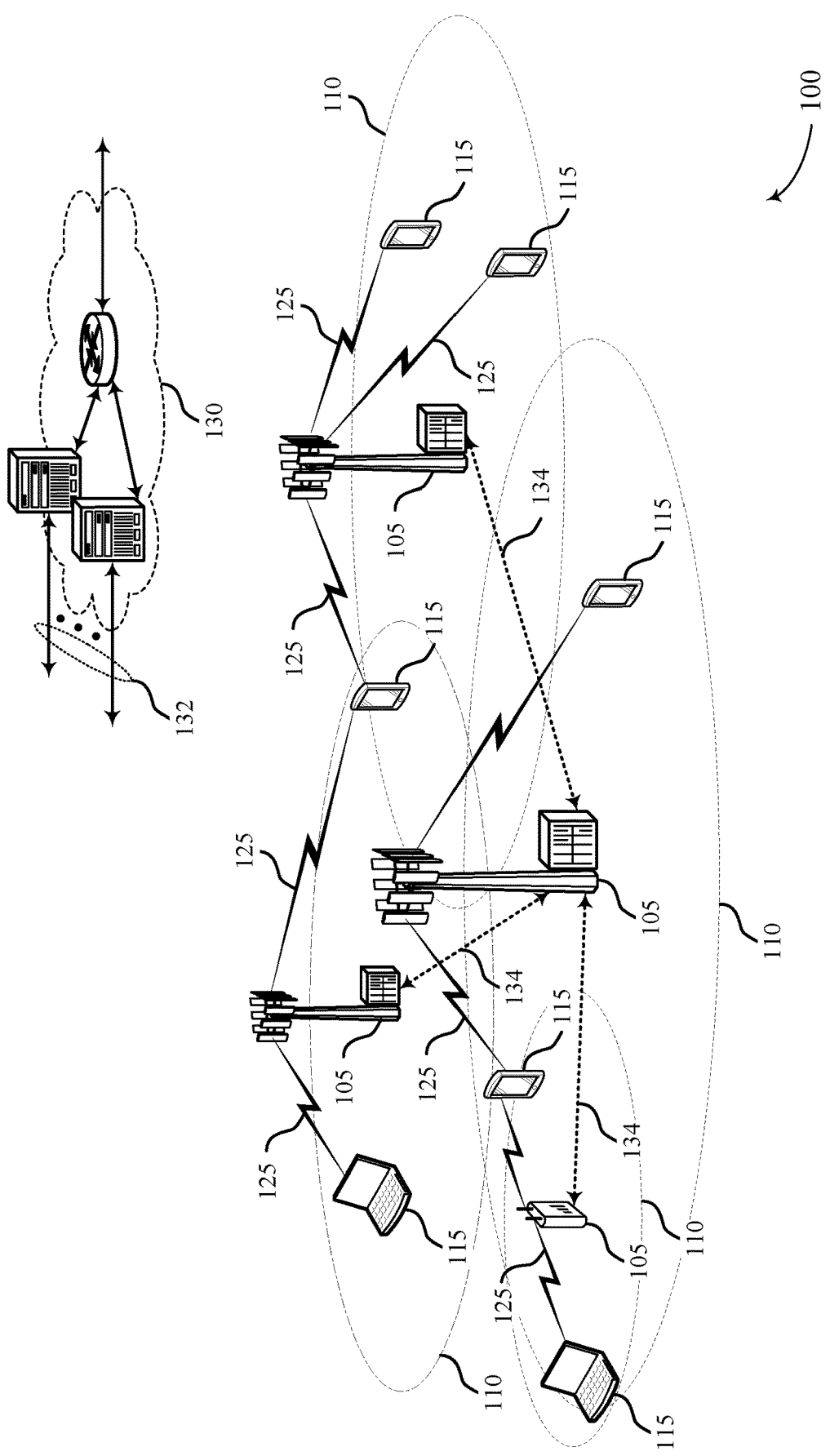
FIG. 1 illustrates an example of a system for wireless communications that supports group physical control channel for autonomous uplink transmissions in accordance with aspects of the present disclosure.

The described techniques relate to improved methods, systems, devices, or apparatuses that support a group physical control channel for controlling autonomous uplink (AUL) transmissions. A base station may configure a set of user equipments (UEs) to monitor a group physical control channel in which control messages may be sent for managing AUL transmissions by the set of UEs. Beneficially, the base station may use a group physical control channel to manage a set of UEs configured to send AUL transmissions in a manner that improves throughput and manages network congestion.

AUL transmission configuration may be, for example, a Type I scheme or a Type II scheme. A Type I scheme may use higher layer signaling (e.g., radio resource control (RRC) signaling) to semi-persistently schedule (SPS) a UE to perform AUL transmissions. The higher layer signaling may specify a modulation and coding scheme, resource allocation, and periodicity of resources allocated for AUL transmissions. A Type II scheme may use layer 1 (L1) signaling to SPS a UE to perform AUL transmissions. The L1 signaling may signal activation or deactivation of resources for AUL transmissions. The L1 signaling may also be used to indicate a modulation and coding scheme, a resource allocation, and periodicity of resources allocated for AUL transmissions. In an example, an AUL transmission may be an uplink grant-free (ULGF) transmission or a configured grant uplink (CG-UL), and an example of which may be an LTE Type-I SPS transmission or type-II SPS transmission in NR.

In some examples, a base station may configure a set of UEs to autonomously transmit uplink communications on resources allocated for AUL transmissions. In such cases, the base station may not be aware of particular timings for uplink transmissions, due to the autonomous nature of such transmissions. Because the UE autonomously initiates AUL transmissions at any point during the resources designated for AUL transmissions, a given AUL transmission from a UE may interfere with one or more other AUL transmissions from other UEs. To increase the likelihood of successful reception and decoding of an AUL transmission at the base station, a UE may periodically retransmit an AUL transmission one or more times. Such periodic retransmissions from multiple UEs can result in channel congestion that detrimentally impacts an error rate for such transmissions. Periodic retransmissions can further result in an increase of collisions in some cases, decreased throughput, and impair user experience.

In an example, a base station may transmit group physical control channel signaling to configure a group of UEs with resources (e.g., allocate designated AUL transmission resources) for AUL transmissions. The group physical control channel signaling may indicate to the group of UEs a group physical control channel (e.g., a group common physical downlink control channel (GC-PDCCH), a group common control channel, etc.) on which the base station may send control messages to manage AUL transmissions by the group of UEs for maintaining efficient usage of the allocated resources (e.g., reduce unneeded retransmissions). In some examples, the base station may configure one or more groups of UEs based on a number of UEs in a given coverage area and/or an amount of available resources (e.g., number of available fields) in a group physical control channel.

In some cases, each UE may be configured to monitor for control messages in a different field in the group physical control channel (e.g., a GC-PDCCH), or multiple UEs may be configured to monitor the same field. The UE may monitor a field in the GC-PDCCH for a control message. For example, the control message may be an acknowledgement (ACK) message or a negative acknowledgement (NACK) message for an AUL transmission sent by the UE, a suspend message to suspend subsequent AUL transmissions, a resume message to resume AUL transmissions, or an ignore message to ignore the group physical control channel. In some cases, the UE may determine whether to retransmit a AUL transmission based on the contents of the control message. By utilizing the GC-PDCCH to administer AUL transmission from a set of UEs, a base station may increase throughput and decrease collisions in the wireless communications system.

Aspects of the disclosure are initially described in the context of a wireless communications system. Aspects of the disclosure are further illustrated by and described with reference to resource grids. Aspects of the disclosure are further illustrated by and described with reference to apparatus diagrams, system diagrams, and flowcharts that relate to group physical control channel for autonomous uplink transmissions.

FIG. 1 illustrates an example of a wireless communications system 100 that supports group physical control channel for autonomous uplink transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit, and a UE 115 may receive, group physical control channel signaling, which may configure a group of UEs that includes the UE 115 to send AUL transmissions (e.g., a Type-I and/or Type-II new radio (NR) uplink grant-free (ULGF) transmissions, or configured grant uplink (CG-UL) transmissions). AUL transmission configuration may be, for example, a Type I scheme or a Type II scheme. A Type I scheme may use higher layer signaling (e.g., RRC) signaling) to SPS a UE to perform AUL transmissions. The higher layer signaling may specify a modulation and coding scheme, resource allocation, and periodicity of resources allocated for AUL transmissions. A Type II scheme may use layer 1 (L1) signaling to SPS a UE to perform AUL transmissions. The L1 signaling may signal activation or deactivation of resources for AUL transmissions. The L1 signaling may also be used to indicate a modulation and coding scheme, a resource allocation, and periodicity of resources allocated for AUL transmissions. The group physical control channel signaling may identify resources for AUL transmissions. In some examples, the group physical control channel signaling, or other downlink signaling, may indicate to the UE 115 a group physical control channel in which the base station 105 may transmit control messages to the group of UEs 115 for managing AUL transmissions.

At some time, a UE 115 may determine to send an AUL transmission and transmit the AUL transmission in accordance with the group physical control channel signaling (e.g., within a resource allocation for AUL resources indicated by the group physical control channel signaling). The base station may receive the AUL transmission, and may make a determination about the content to include in a control message for managing of AUL transmissions based in part on the received AUL transmission. For example, the base station may consider a current congestion level, successful or unsuccessful decoding of the AUL transmission, or detected collisions between UEs 115 transmitting AUL transmissions. To send a control message to a particular UE 115 or multiple UEs 115, the base station may configure the one or more UEs 115 to monitor a particular field of the group physical control channel, and may send the control message in a particular field of the group physical control channel.

The UE 115 may monitor the field of the group physical control channel, as indicated in the group physical control channel signaling or by other signaling. The UE 115 may receive a control message in the group physical control channel. In some cases, the UE 115 may determine whether to retransmit the AUL transmission based on the received control message. In some cases, the control message may include a deactivate message indicating that the AUL transmission resources are inactive, and the UE 115 may halt subsequent AUL transmissions. A control message may also be an acknowledgement (ACK) message, or a negative acknowledgement (NACK) message. A control message may also be a suspend message to suspend subsequent AUL transmissions, a resume message to resume AUL transmissions. In some examples, the suspend message or the resume message may be with respect to an AUL transmission within a particular transmission period configured for a AUL transmission (e.g., suspend and resume may be with respect to a transmission within a transmission period of the configured ULGF/AUL transmission), or on resources allotted for AUL transmission. In some examples, the control message may be an ignore message to ignore the group physical control channel, or the like. Beneficially, the base station may use a group physical control channel to manage a set of UEs 115 configured to send AUL transmissions in a manner that improves throughput and manages network congestion.

Figure 2:
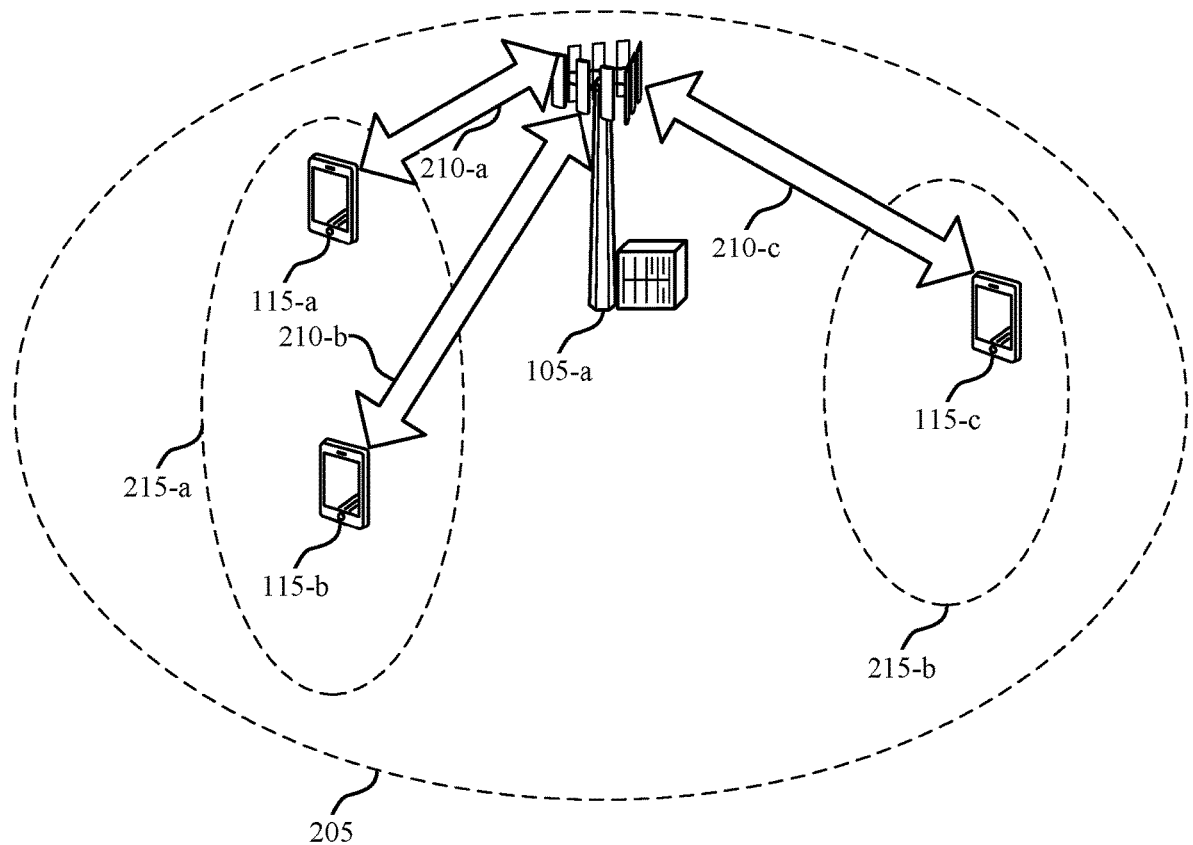
FIG. 2 illustrates an example of a wireless communications system that supports group physical control channel for autonomous uplink transmissions in accordance with aspects of the present disclosure.

FIG. 2 illustrates an example of a wireless communications system 200 that supports group physical control channel for autonomous uplink transmissions in accordance with aspects of the present disclosure. In some examples, wireless communications system 200 may implement aspects of wireless communications system 100. Wireless communications system 200 may include a base station 102-*a* and UE 115-*a*, UE 115-*b*, and UE 115-*c*, which may be examples of the corresponding devices described with reference to FIG. 1.

In some examples of a wireless communications system, base station 105-*a* may be in communication with one or more UEs 115 and administer AUL transmission by the one or more groups of UEs 115. Base station 105-*a* may communicate with UEs 115 in coverage area 205, such as UE 115-*a*, UE 115-*b*, and UE 115-*c*. Base station 105-*a* may transmit a group physical control channel signaling via bidirectional communication links 210-*a*, 210-*b*, and 210-*c*. The group physical control channel signaling may include configuration information, which may designate resources for the group physical control channel and AUL transmissions. The group physical control channel signaling may indicate a modulation and coding scheme, periodicity of the group physical control channel, a resource allocation for AUL resources, a periodicity of the allocated AUL resources, or the like. In some examples, the group physical control channel signaling may be a broadcast transmission that provides broadcast control of the AUL resources.

Any of UE 115-*a*, UE 115-*b*, or UE 115-*c* may autonomously determine to send an AUL transmission on any of the designated resources of AUL transmissions. For example, UE 115-*a* and UE 115-*c* may initiate an AUL transmission at the same time using the same AUL resources, which may result in a collision. In some cases, base station 105-*a* may unsuccessfully decode one or both of the AUL transmissions from UE 115-*a* and UE 115-*b*. Alternatively or additionally, base station 105-*a* may successfully decode one or more AUL transmissions from UEs 115, but contemporary AUL transmissions on the designated AUL resources may result in channel congestion and may increase processing and/or scheduling delays.

In some cases, a UE 115 may be configured to retransmit an AUL transmission one or more times, to increase the likelihood of successful reception and decoding at base station 105-*a*. However, frequent retransmissions may be unnecessary if an earlier transmission or retransmission has already been successfully received and decoded by base station 105-*a*. Furthermore, such retransmissions may increase the number of collisions, an interference level, and increase congestion level on a wireless channel.

In some examples, base station 105-*a* may utilize a group physical control channel (e.g., a GC-PDCCH) to administer AUL transmissions and mitigate the interference and congestion issues that can arise from AUL transmissions. Base station 105-*a* may organize the UEs 115 within coverage area 205 into one or more groups 215. For example, group 215-*a* may include multiple UEs, such as UE 115-*a* and UE 115-*b*. Group 215-*b* may include a single UE 115-*c*. Each group 215 may be configured to send AUL transmissions on designated AUL resources. Each UE 115 in each group 215 may be configured to monitor fields of a GC-PDCCH for control messages.

UEs 115 may transmit AUL transmissions, and may receive a control message in a field of the GC-PDCCH. UEs 115 may adjust its behavior based on a received control message. For example, UE 115-*a* may transmit an AUL transmission via bidirectional link 210-*a* to base station 105-*a*. UE 115-*a* may monitor the field of the GC-PDCCH to receive a control message. The control message may be an acknowledgement (ACK) message, a negative acknowledgement (NACK) message, a suspend message to suspend subsequent AUL transmissions, a resume message to resume AUL transmissions, an ignore message, or the like. UE 115-*a* may determine whether to retransmit an AUL transmission based on the received control message, as described in further detail with respect to FIG. 3.

Base station 105-*a* may configure and reconfigure groups 215. Base station 105-*a* may also configure the fields of the GC-PDCCH for the groups 215 based on a number of UEs 115 in coverage area 205, available resources on the GC-PDCCH, or other considerations. For example, base station 105-*a* may configure each UE 115 to monitor a different field of the GC-PDCCH. In some cases, base station 105-*a* may configure multiple UEs 115 to monitor the same field of the GC-PDCCH. For instance, UE 115-*a* and UE 115-*b* of group 215-*a* may monitor the same field, and UE 115-*c* of group 215-*c* may monitor a field that corresponds only to UE 115-*c*. Base station 105-*a* may also configure the groups 215 and control messages on the GC-PDCCH based on a number of additional considerations, such as a number of current or pending HARQ procedures, a number of UEs 115 in coverage area 205, and the like, as described in greater detail with respect to FIG. 4.

Figure 3:
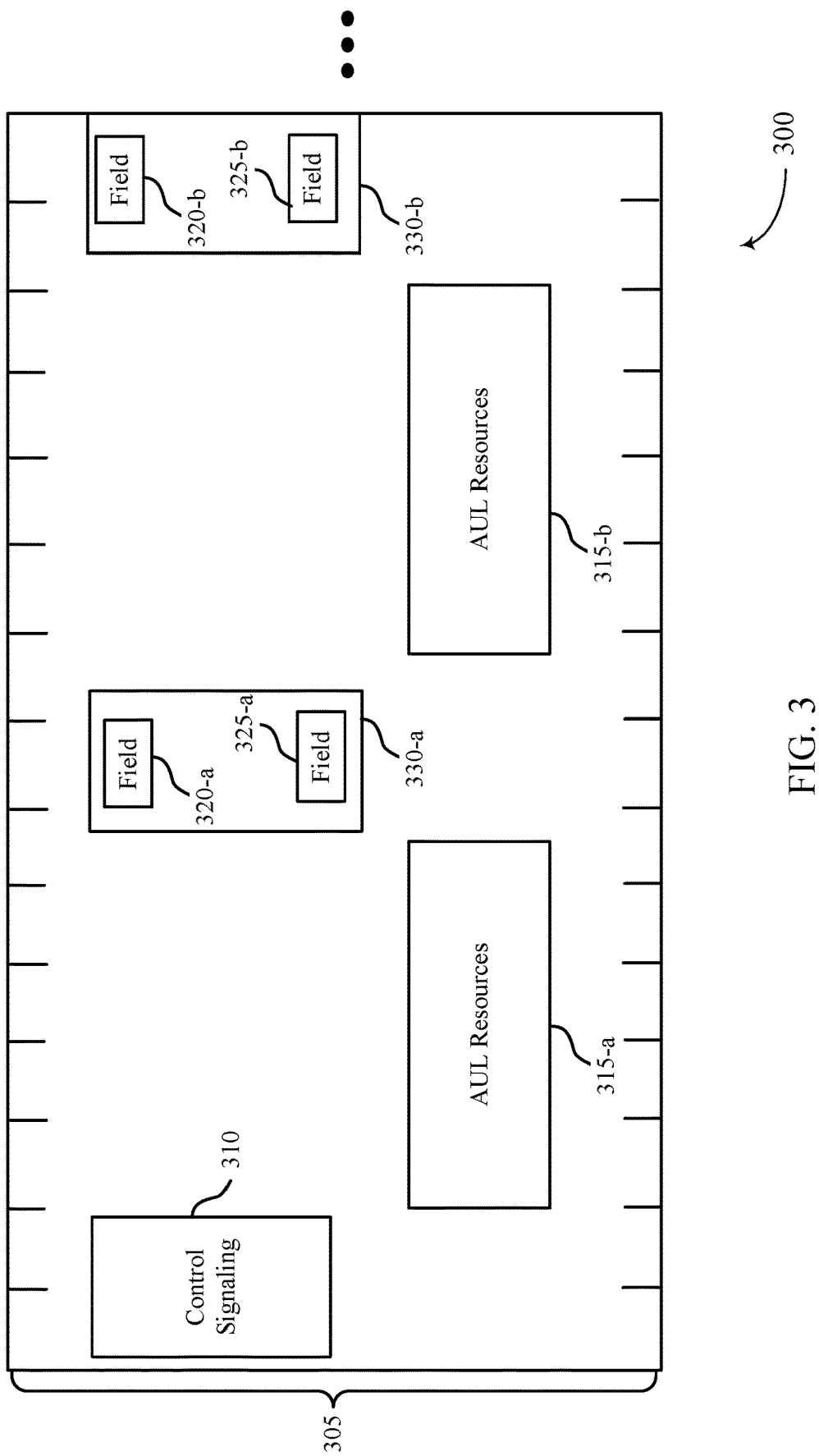
FIG. 3 illustrates an example of a resource grid that supports group physical control channel for autonomous uplink transmissions in accordance with aspects of the present disclosure.

FIG. 3 illustrates an example of a resource grid 300 that supports group physical control channel for autonomous uplink transmissions in accordance with aspects of the present disclosure. In some examples, resource grid 300 may implement aspects of wireless communications system 100. Resource grid 300 may be utilized by base stations 105 and UEs 115, as described with reference to FIGS. 1 and 2. Only a portion of resource grid 300 is depicted, and resource grid 300 may continue in perpetuity. Frequency corresponds to the vertical axis and time corresponds to the horizontal axis.

Base station 105-*a* may manage AUL transmissions of one or more groups of UEs 115-*a* via group physical control channel signaling 310. Base station 105-*a* transmit group physical control channel signaling 310 within available bandwidth 305 to configure a group of UEs that includes UE 115-*a*. The group physical control channel signaling 310 may be broadcast, and may be used to provide broadcast control of the AUL resources 315. The bandwidth 305 may span a frequency range over which the base station 105-*a* may allocate resources for uplink and/or downlink transmission, including for AUL transmissions and non-AUL transmissions. The bandwidth 305 may be divided up into resource blocks that correspond to a set of symbol periods and a set of subcarriers.

Control signaling 310 may indicate resources of a group physical control channel 330 that includes one or more fields 320 and 325 (e.g., one or more resource blocks or portions thereof). The fields 320 and 325 may transport control messages for managing AUL transmissions. Control signaling 310 may be located within a single resource block (RB), a subset of an RB, or in multiple RBs. Furthermore, control signaling 310, AUL resources 315, and group physical control channel 330 (e.g., GC-PDCCH) each may be located within a same RB, a portion of a same RB, or in a common set of one or more RBs, or up to each may be located in a different RB.

Control signaling 310 may indicate AUL resources 315-*a* that are allocated for sending AUL transmissions, and may indicate a group physical control channel 330 (e.g., the time-frequency resources allocated for communicating a GC-PDCCH). Control signaling 310 may also specify a modulation and coding scheme and periodicity at which AUL resources 315-*a* and AUL resources 315-*b* repeat over time. Control signaling 310 may further include an activate message. For instance, control signaling 310 may contain an activate message to indicate that AUL resources 315 have been allocated for AUL transmissions and are active for use. In some examples, one or more fields 320 may include a deactivate message to indicate that AUL resources 315, and up to each repetition thereof corresponding to the indicated periodicity, are not available for AUL transmissions. In some cases, the deactivate message may be specific to a particular UE in the set of UEs, or a subset of the set of UEs, or may apply to all UEs in the set of UEs. When deactivated, a UE 115-*a*, as well as up to all UEs in the set of UEs, may refrain from sending subsequent AUL transmissions in the AUL resources 315 and each repetition thereof until a subsequent activate message is received.

Control signaling 310 may also indicate a group physical control channel (e.g., GC-PDCCH) that controls AUL transmission. Control signaling 310 may indicate, for example, time and frequency resources of the group physical control channel 330, and a periodicity of the group physical control channel 330. In an example, the GC-PDCCH (e.g., group physical control channel 330) may include one or more fields, such as field 320 and field 325. The control signaling 310 may configure one or more UEs 115 to monitor one or each of the one or more fields for control messages.

UE 115-*a* may receive control signaling 310, and may determine that AUL resources 315-*a* and 315-*b* have been allocated for AUL transmissions. UE 115-*a* may further monitor an assigned field of the group physical control channel 330 (e.g., field 320-*a* or 325-*b* of channel 330-*a*). For example, control signaling 310 may indicate that UE 115-*a* is to monitor field 320-*a*, and UE 115-*b* is to monitor field 325-*a*.

In some examples, UE 115-*a* may transmit an AUL transmission on AUL resources 315-*a*. UE 115-*a* may then monitor field 320-*a* of the group physical control channel 330 for a control message. In some examples, the UE 115-*a* may not monitor every occurrence of the field 320 in each occurrence of the group physical control channel 330 based on the periodicity of the channel 330. Rather, the UE 115-*a* may monitor the next instance (or a subsequent instance) of field 320 in the group physical control channel 330 that occurs after the UE 115-*a* transmits an AUL transmission in an instance of the AUL resources 315 that precedes a next instance of channel 330. For example, the UE 115-*a* may transmit an AUL transmission in AUL resources 315-*a*, and then monitor field 320-*a* in the next instance of group physical control channel 330-*a*.

In some examples, a field of the group physical control channel 330 may include a control message that is an ACK message. By monitoring field 320-*a*, UE 115-*a* may receive the ACK message corresponding to an initial AUL transmission on AUL resources 315-*a*. The ACK message may indicate that base station 105-*a* successfully received and decoded the initial AUL transmission. UE 115-*a* may determine, based on the ACK message, not to transmit a retransmission of the AUL transmission. That is, the UE 115-*a* may receive the ACK message and determine to early terminate a repeated transmission of the AUL transmission for a given HARQ process within a transmission period.

In some examples, a field of the group physical control channel 330 may include a control message that is a NACK message. By monitoring field 320-*a*, UE 115-*a* may receive the NACK message corresponding to an initial AUL transmission on AUL resources 315-*a*. The NACK message may indicate that base station 105-*a* did not successfully decode the initial AUL transmission. UE 115-*a* may determine to transmit a retransmission of the AUL transmission on AUL resources 315-*b* based on the NACK message. In some examples, after sending a retransmission of the AUL transmission on AUL resources 315-*b*, UE 115-*a* may monitor field 320-*b*. If UE 115-*a* receives another NACK control message, UE 115-*a* may retransmit the AUL transmission on subsequent AUL resources 315. If UE 115-*a* receives an ACK control message in field 320-*b*, UE 115-*a* may determine not to retransmit the AUL transmission.

In some examples, a field of the group physical control channel 330 may include a control message that is a suspend message. The suspend message may indicate that UE 115-*a* is to suspend subsequent AUL retransmissions. A suspend message may suspend all subsequent AUL transmissions from UE 115-*a*, or may apply to a retransmission of an AUL transmission corresponding to a particular HARQ process (e.g., most recent or currently periodically repeating AUL transmission). For example, the suspend message may indicate that UE 115-*a* is to suspend repeated AUL transmissions for a given HARQ process.

In some examples, a field of the group physical control channel 330 may include a control message that is a resume message. The resume message may indicate that UE 115-*a* may resume a suspended transmission of AUL transmissions on AUL resources 315. In some examples, the resume message may apply to a particular AUL transmission (e.g., most recent or currently periodically repeating AUL transmission). That is, the resume message may indicate that UE 115-*a* is to resume a suspended transmission for a certain HARQ process. For instance, UE 115-*a* may send an AUL transmission on AUL resources 315-*a*. A suspend control message may be received in field 320-*a*, and UE 115-*a* may suspend retransmissions of the AUL transmission. UE 115-*a* may receive a resume message in field 320-*b*, and may subsequently resume retransmissions of the same AUL transmission in subsequent AUL resources 315.

In some examples, a field of the group physical control channel 330 may include a control message that is an ignore message (e.g., a no-operation or a default operation message). The ignore message may indicate that UE 115-*a* should revert to default behavior, or that UE 115-*a* should ignore the group physical control channel 330. UE 115-*a* may send an AUL transmission on AUL resources 315-*a*, and may receive an ignore message in field 320-*a*. The ignore message may indicate that UE 115-*a* is to assume a default behavior as if the group physical control channel 330 is not received. In such examples, UE 115-*a* may send one or more retransmissions of the AUL transmission on AUL resources 315-*b*, and subsequent AUL resources 315. If UE 115-*a* receives another control message in field 320-*b* (e.g., an ACK message or a suspend message), UE 115-*a* may determine not to transmit subsequent retransmissions of the AUL transmission.

In some examples, a field of the group physical control channel 330 may include a control message that is an activate message or a deactivate message. For instance, if control signaling 310 configures, but does not activate, AUL resources 315, field 320-*a* may contain an activate message to indicate that AUL resources 315-*b* are available for AUL transmissions. If field 320-*b* contains a deactivate message, then one or more UEs 115 configured to monitor field 320-*b* may determine that subsequent AUL resources 315 are not available for AUL transmissions, and may refrain from sending AUL transmissions on AUL resources 315. In some cases, the base station 105-*a* may maintain the AUL resources 315 in a deactivated state until the base station 105-*a* determines to transmit an activate message in a subsequent instance of field 320. In some examples, such as Type II SPS, the base station 105-*a* may use unicast control, such as L1 signaling (e.g., PDCCH), to send the activation message or the deactivation message. In some cases, the group physical control channel 330 may be a broadcast transmission and/or a multi-cast transmission. In case of conflict, unicast control (e.g., L1/PDCCH/unicast) may take precedence over broadcast or multi-cast control, and hence a UE 115-*a* may follow an L1 signaling indication about whether the AUL resources 315 are active, and ignore an activate or deactivate message received in a field of the group physical control channel 330. In an example, Type-II SPS in NR may be controlled using a unicast control message. Where both a unicast control message and a multi-cast control message is detected, UE 115 may assume that the unicast control message takes precedence. In other examples, broadcast control may take precedence over unicast control, and an activate or deactivate message transmitted in channel 330 may take precedence over L1 signaling.

In some examples, a control message may be conveyed in a field that may be decoded to obtain a number of bits. For example, field 320 and field 325 may be decoded to respectively derive two-bits from each field. In such examples, the two-bit field 320 and two bit field 325 may convey one of four indications (e.g., one of four types of control message). For instance, a two-bit field 320-*a* may be one of an ACK message (e.g., a pair of bits having a value of '00'), a suspend message (e.g., a pair of bits having a value of '01'), a resume message (e.g., a pair of bits having a value of '10'), or an ignore message (e.g., a pair of bits having a value of '11'). In some examples, a two-bit field may be used to signal one of a different combination of control messages (e.g., one of the four control messages may be a NACK message, an activate message, or a deactivate message). In some examples, a field 320 or a field 325 may include fewer or more than two bits. In the case of multiple HARQ processes corresponding to multiple AUL transmissions by a UE, the base station 105-*a* may allocate up to a different field per HARQ process (e.g., two bits may be allocated per HARQ process). For example, field 320 may correspond to a first HARQ process, and field 325 may correspond to a second HARQ process. Field 320 may transport an acknowledgement message or a negative acknowledgement message for the first HARQ process, and field 325 may transport an acknowledgement message or a negative acknowledgement message for the second HARQ process.

Figure 4:
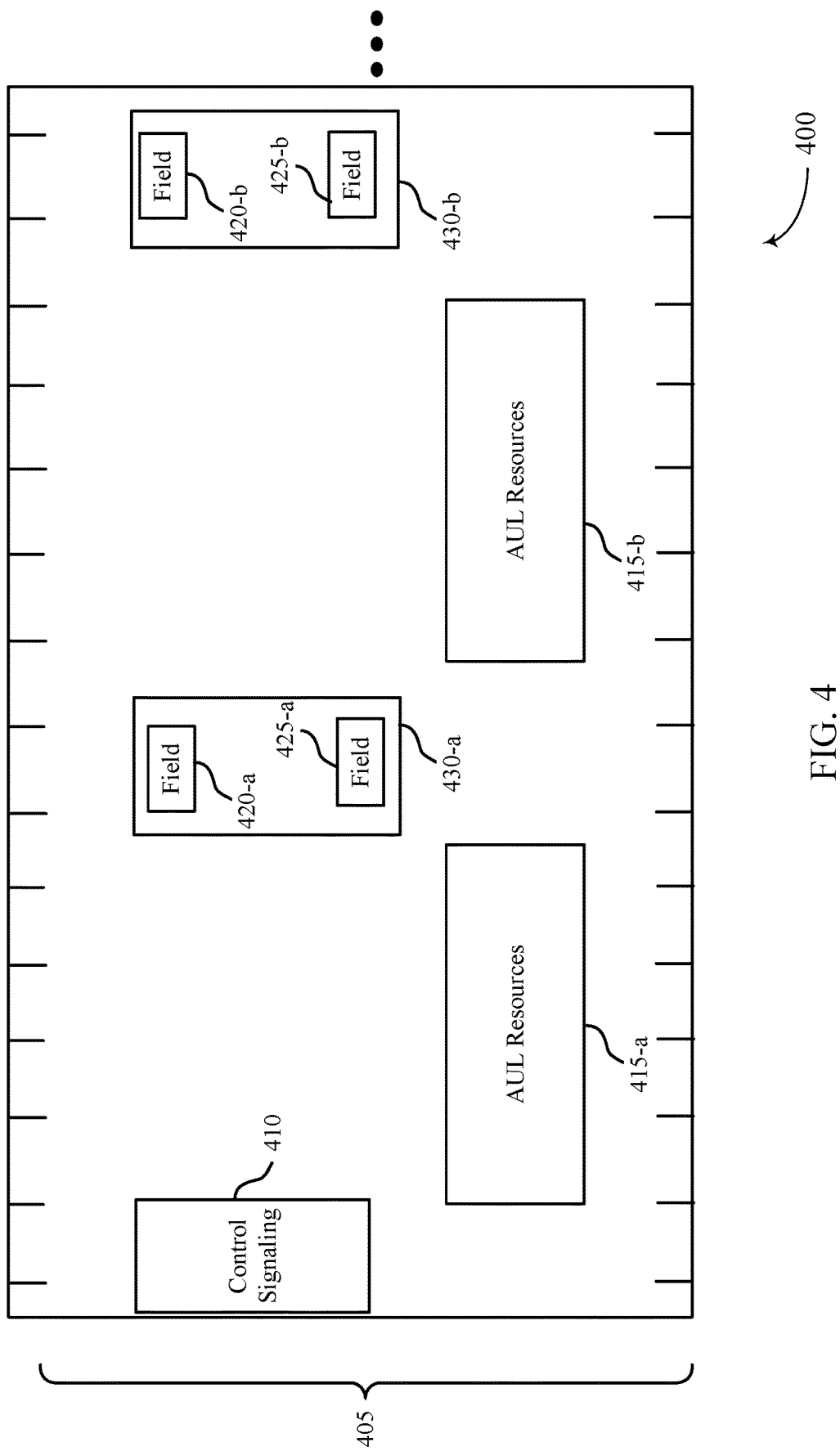
FIG. 4 illustrates an example of a resource grid that supports group physical control channel for autonomous uplink transmissions in accordance with aspects of the present disclosure.

FIG. 4 illustrates an example of a resource grid 400 that supports group physical control channel for autonomous uplink transmissions in accordance with aspects of the present disclosure. In some examples, resource grid 400 may implement aspects of wireless communications system 100. Resource grid 400 may be utilized by base stations 105 and UEs 115, as described with reference to FIGS. 1, 2, and 3, and is an example of the resource grid 300.

As in the example of FIG. 3, base station 105-*a* may manage AUL (e.g., CG-UL) transmissions from one or more groups of UEs 115 via group physical control channel signaling. Specifically, base station 105-*a* may determine groups of UEs 115, may configure the UEs and groups of UEs for AUL transmission, and may determine what types of control message to send to UEs 115 via fields of a GC-PDCCH.

Base station 105-*a* transmit group physical control channel signaling 410 within available bandwidth 405 to configure a group of UEs 115 that includes UE 115-*a*. The group physical control channel signaling 410 may be broadcast, and may be used to provide broadcast control of the AUL resources 415. The bandwidth 405 may span a frequency range over which the base station 105-*a* may allocate resources for uplink and/or downlink transmission, including for AUL transmissions and non-AUL transmissions. The bandwidth 405 may be divided up into resource blocks that correspond to a set of symbol periods and a set of subcarriers.

In some cases, base station 105-*a* may send control signaling 410 to one or more UEs 115. Control signaling 410 may indicate to a set of one or more UEs a group physical control channel 430 (e.g., a GC-PDCCH) that may include fields such as 420 and 425, in which the base station 105-*a* may transmit control messages to the UEs 115. The base station 105-*a* may broadcast the control signaling 410 to UEs 115 within its coverage area. Alternatively or additionally, control signaling 410 may be RRC signaling, downlink control indicator (DCI) signaling, or the like, or used in combination with RRC signaling, DCI signaling, or the like. Control signaling 410 may configure AUL resources 415 and may activate or deactivate the AUL resources 415, as described with respect to FIG. 3.

Base station 105-*a* may configure UEs 115 to monitor fields of channel 430 (e.g., GC-PDCCH). In some examples, control signaling 410 may indicate the time and frequency resources of the GC-PDCCH and a periodicity of the GC-PDCCH. In some examples, control signaling 410 may configure each UE 115 to monitor one or more fields in the GC-PDCCH. In some examples, the base station 105-*a* may use RRC signaling, DCI signaling, or the like, to configure each UE 115 with which field within the GC-PDCCH that each UE 115 is to monitor for its control messages. In some examples, the fields may be decoded to obtain two or more bits. In an example, a UE 115-*a* may monitor field 420 and a UE 115-*b* may monitor field 425. In such an example, each control message that base station 105-*a* transmits on one of field 420 and field 425 may be specific to only one UE 115.

For example, UE 115-*a* may send an AUL transmission on AUL resources 415-*a*. Base station 105-*a* may receive the AUL transmission, and may send an ACK control message on field 420-*a*. UE 115-*a* may receive the ACK control message, and may determine not to send any retransmissions on AUL resources 415-*b* because the base station 105-*a* indicated that is successfully received the earlier AUL transmission. In some examples, the base station 105-*a* may not successfully receive an AUL transmission from UE 115-*b*. Base station 105-*b* may send a NACK control message in field 425-*a*, and UE 115-*b* may determine to resend the AUL transmission on AUL resources 415-*b*. Base station 105-*a* may receive the retransmitted AUL transmission, and may send an ACK control message in field 425-*b*, indicating that UE 115-*b* does not need to retransmit the AUL transmission.

In some examples, base station 105-*a* may over-configure fields of the group physical control channel 430, such that the base station 105-*a* may configure multiple UEs 115 to monitor the same field. In some cases, it may be likely that multiple UEs 115 are not transmitting the AUL transmission at the same time. In such examples, despite the fact that multiple UEs 115 may be monitoring a same field, only the UE 115 that has transmitted an AUL transmission may be affected by the content of the field being monitored. That is, if base station 105-*a* configures UE 115-*a*, UE 115-*b*, and UE 115-*c* to monitor field 420-*a*, but only UE 115-*a* transmits an AUL transmission on AUL resources 415-*a*, base station 105-*a* may send a control message in field 420-*a* to UE 115-*a*. Base station 105-*a* may determine that UE 115-*b* and UE 115-*c* will not be affected by the control message to UE 115-*a* (because neither UE 115-*b* nor UE 115-*c* sent an AUL transmission during AUL resources 415-*a*). The control message in field 420-*a* may be tailored to UE 115-*a*, and UE 115-*a* may be the only one of UE 115-*b* and UE 115-*c* to receive, decode, and act upon the control message in field 420-*a*. UE 115-*b* and UE 115-*c* may ignore (e.g., may determine not to decode) the control message in field 420-*a*. UE 115-*b* and UE 115-*c* may determine to ignore the control message in field 420-*a* based on the determination that UE 115-*b* and UE 115-*c* have not made an AUL transmission prior to monitoring field 420-*a*, and are thus not expecting to receive a control message from base station 105-*a* in field 420-*a*.

In some cases, base station 105-*a* may configure multiple UEs 115 (e.g., UE 115-*a*, UE 115-*b*, and UE 115-*c*) to perform AUL transmissions, and to monitor field 420 and field 425, of a GC-PDCCH. Base station 105-*a* may receive one or more AUL transmissions, and may make a determination about what information to include in a control message to send in fields 420 and 425. Base station 105-*a* may determine what control messages to send based on a variety of considerations, such as: how many UEs are located in a geographic coverage area, how many resources are available in the GC-PDCCH, and which UEs 115 have an ongoing HARQ process, and the like.

In an example, base station 105-*a* may configure UE 115-*a* to monitor field 420-*a*, and may configure UE 115-*b* and UE 115-*c* to monitor field 425-*a*. UE 115-*b* may send an AUL transmission on resources 415-*a*, but UE 115-*c* may not send an AUL transmission in resources 415-*a*. In such an example, base station 105-*a* may send a control message that applies to UE 115-*b* in field 425-*a*. UE 115-*b* and UE 115-*c* may monitor field 425-*a*, but only UE 115-*b* may act in response to the control message, because UE 115-*b* is the only UE in the group that sent an AUL transmission and may have an ongoing HARQ process.

In some cases, UE 115-*b* and UE 115-*c* may send AUL transmissions at, or about at, the same time on AUL resources 415-*a*. In such cases, base station 105-*a* may make a determination as to how to respond. For example, in the case that UE 115-*b* and UE 115-*c* both transmit their AUL transmission at the same time, field 425-*a* may bundle a decoding determination and take the worst case. That is, if base station 105-*a* receives and successfully decodes both of the AUL transmissions, then base station 105-*a* may send an ACK control message in field 425-*a*. If base station 105-*a* cannot decode either of the AUL transmissions, then base station 105-*a* may send a NACK control message in field 425-*a*. If, however, base station 105-*a* successfully decodes the AUL transmission from UE 115-*b*, and does not successfully decode the AUL transmission from UE 115-*c*, then base station 105-*a* may generate the control message for field 425-*a* based on the worst case of the two. That is, because one of the two AUL signals was not successfully decoded, base station 105-*a* may send a NACK control message in field 425-*a*, to cause both UE 115-*b* and UE 115-*c* to retransmit their respective AUL transmission on AUL resources 415-*b*.

In some cases, two UEs 115 (e.g., UE 115-*b* and UE 115-*c*) may consistently collide. For example, base station 105-*a* may map UE 115-*b* and UE 115-*c* to monitor the same field 425. Over a period of time, UE 115-*b* and UE 115-*c* may consistently or repeatedly send AUL transmissions and retransmissions at the same time or at about the same time. Base station 105-*a* may successfully receive transmissions from, for example, UE 115-*b*. However, if base station 105-*a* regularly fails to successfully receive AUL transmissions from UE 115-*c*, base station 105-*a* may transmit a NACK control message in field 425, resulting in subsequent retransmissions from both UE 115-*b* and UE 115-*c*, thereby causing UE 115-*b* to retransmit AUL transmissions that the base station 105-*a* has already successfully received. In such cases, base station 105-*b* may detect that UE 115-*b* and UE 115-*c* are colliding (e.g., after a threshold number of retransmissions of successfully received AUL transmissions by one of the UEs), and map UE 115-*b* and UE 115-*c* to different fields of the group physical control channel 430. The base station 105-*a* may then transmit different control messages to UE 115-*b* and UE 115-*c* in different field to halt, in this example, UE 115-*b* from having to continue retransmitting.

In some cases, base station 105-*b* may utilize a hash function to introduce randomization to the GC-PDCCH. That is, base station 105-*a* may configure one or more UEs 115 to monitor fields that are randomly determined via, for example, a hash function. Such randomization may avoid or reduce collisions even when two or more UEs 115 consistently or regularly transmitting AUL transmissions at the same time or close to the same time.

The hash function may provide some randomization in the location of which field a UE monitors to reduce the likelihood of two or more UEs 115 persistently colliding. A hash function may be known at base station 105-*a* and at a UE, such as UE 115-*a*. The base station 105-*a* and the UE 115-*a* may use the hash function to identify the location of a field within the group physical control channel 430. An input known at a UE 115 and base station 105-*a* may be used to determine the location of the field. In an example, the input may be any one of a slot index in which UE 115-*a* sends an AUL transmission, a time at which UE 115-*a* transmits (or retransmits) the AUL transmission (e.g., a first symbol period of the AUL transmission), an identifier of the UE 115 (e.g., Radio Network Temporary Identifier assigned to the UE), or an identifier of the HARQ process, or a combination thereof. The input to the hash function may determine which field within the group physical control channel 430 includes a control message for a UE, instead of having the base station 105-*a* explicitly configure the UE 115 with a specified field of the group physical control channel 430 to monitor.

As an example, UE 115-*a* and base station 105-*a* may be preconfigured with the hash function, or the base station 105-*a* may signal an indication to the UE 115-*a* about which hash function to use. The input to the hash function may be the time at which a UE transmits an AUL transmission (e.g., particular symbol period). For example, UE 115-*a* may initiate an AUL transmission in symbol period 1, which may be received by base station 105-*a* in symbol period 1. Both UE 115-*a* and base station 105-*a* input a value corresponding to symbol period 1 into the hash function. Applying the input to the hash function may result in an output which indicates the location of, for example, field 420-*a* of group physical control channel 430-*a*. Base station 105-*a* may transmit a control message in field 420-*a*, and the UE 115-*a* may similarly determine that it is to monitor field 420-*a* based on the transmission time and the hash function. The UE 115-*a* may then decode field 420-*a* to receive its control message. Thus, the field monitored by the UE 115-*a* may vary over time due to the UE 115-*a* varying the time at which an AUL is transmitted, thereby introducing some randomization and reducing the likelihood of a collision between UE 115-*a* and another UE.

In some examples, the input to the hash may be a HARQ identifier. UE 115-*a*, for example, may initiate an AUL transmission on AUL resources 415-*a*. The initiation of an AUL transmission may initiate a HARQ procedure. That is, UE 115-*a* may expect an indication as to whether the AUL transmission was transmitted, and may continue to retransmit until an acknowledgment message is received. Each HARQ process may be known to UE 115-*a* and base station 105-*a* by a HARQ identifier. Such a HARQ identifier may be utilized by the base station to differentiate between an acknowledgment message or negative acknowledgment message for a particular AUL transmission from UE 115-*a*, and an acknowledgment message or negative acknowledgment message for a different AUL from UE 115-*a* or by a different UE 115.

In some examples, the HARQ identifier may be input to the hash function. For example, the HARQ identifier corresponding to an AUL transmission on AUL resources 415-*a* may be input to the hash function to determine the location of, for example, field 420-*a*. If base station 105-*a* receives the AUL transmission and sends an ACK in field 420-*a*, then the HARQ process ends and the HARQ identifier is no longer used as the input. However, if base station 105-*a* does not successfully receive the AUL transmission and sends a NACK control message in field 420-*a*, then the same HARQ process may continue. In such examples, base station 105-*a* and UE 115-*a* may input the same HARQ identifier to determine the location of fields 420-*b*.

In some examples, a separate field of the group physical control channel 430 may be used for each HARQ process and corresponding identifier. In some examples, base station 105-*a* may determine not to utilize one field for each HARQ process, because doing so may quickly utilize all available fields of channel 430. In some examples, base station 105-*a* may introduce a timing relationship between the HARQ processes. A transmission time of the group physical control channel 430 (e.g., GC-PDCCH) may map to a time window having a defined duration (e.g., a window having a duration that includes one or more slots, TTIs, or the like). If a starting position of multiple AUL transmissions by UE 115-*a* occurs within the time window, multiple fields are hashed. For example, a HARQ identifier for each of the corresponding HARQ processes for the multiple AUL transmissions may be input into a hash function. The UE 115-*a* and the base station 105 may determine a location of the field using the hash function. The base station 105 may bundle feedback for the multiple HARQ processes of the UE 115-*a*. The base station 105-*a* may transmit an acknowledgment message in the field if able to successfully decode all of the multiple AUL transmissions transmitted within the time window. Otherwise, the base station 105-*b* may transmit a negative acknowledgment if unable to successfully decode at least one of the multiple AUL transmissions. Thus, the base station 105-*a* may conserve fields of the group physical control channel 430 and permit one UE 115-*a* from over-utilizing the fields. In some cases, the base station 105-*a* may implement the time window restriction when at least a threshold number of AUL transmissions are received within a duration of the time window.

In some examples, the input to the hash may be time information. That is, the input to the hash may be a slot index, a subframe index, a frame index, or the like, or any combination thereof. In some cases, the slot index, the subframe index, and/or the frame index may be at least part of one or more inputs to the hash function. In an example, the input to the hash may be a slot index of the AUL transmission. For example, UE 115-*a* may send an AUL transmission in a particular slot having a slot index of, for example, 1. Base station 105-*a* may receive the AUL transmission, and may identify the slot index in which the AUL transmission was received. Base station 105-*a* and UE 115-*a* may apply the index value of 1 to the hash, and may calculate a location of field 420-*a* (e.g., a slot with an index number of 7). Base station 105-*a* may transmit, and UE 115-*a* may receive, a control message in field 420-*a* based on the hash function using the slot index value of 1 as the input.

In some examples, the UE identifier may be the input to the hash function. The UE identifier may be a Radio Network Temporary Identifier (RNTI) or other information that may or may not uniquely identify the UE. For instance, UE 115-*a* may apply its own UE identifier value to the hash function. Base station 105-*a* may know the UE identifier value for UE 115-*a* via a handover procedure from when the UE 115-*a* entered the geographic coverage area, or via other signaling (e.g., RRC signaling). Base station 105-*a* and UE 115-*a* may apply the UE identifier to the hash function to calculate a location of field 420-*a* (e.g., a subsequent TTI). Base station 105-*a* may transmit, and UE 115-*a* may receive, a control message in field 420-*a* which may be located based on the hash function using the UE identifier as the input.

Base station 105-*a* may determine which control message to send based on a variety of factors, as described above, and as further described with reference to FIG. 5.

Figure 5:
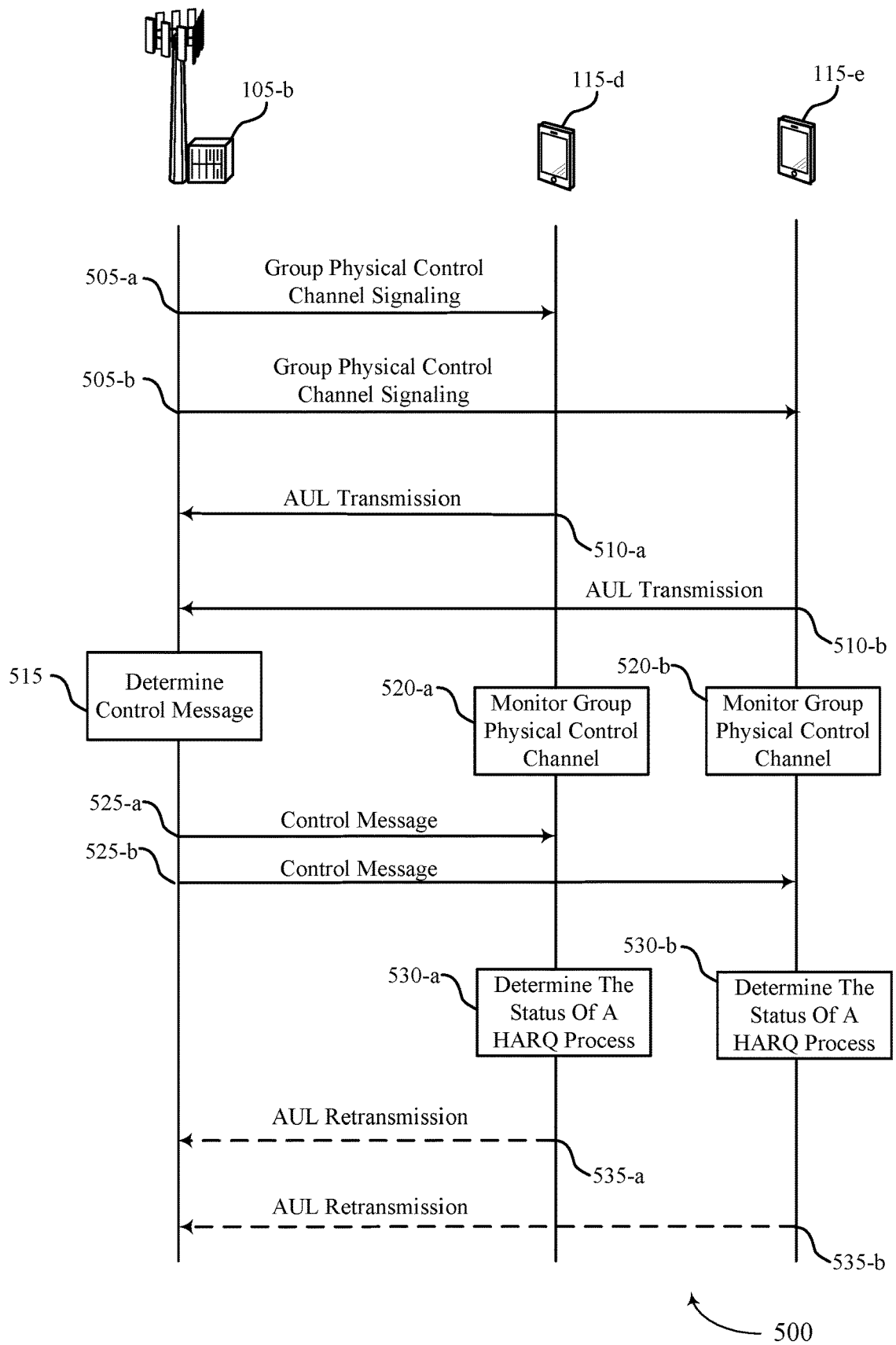
FIG. 5 illustrates an example of a process flow that supports group physical control channel for autonomous uplink transmissions in accordance with aspects of the present disclosure.

FIG. 5 illustrates an example of a process flow 500 that supports group physical control channel for autonomous uplink transmissions in accordance with aspects of the present disclosure. In some examples, process flow 500 may implement aspects of wireless communications systems 100 and 200. Process flow 500 may include a UE 115-*d* and base station 105-*b*, which may be respective examples of a UEs 115 and a base stations 105 as described herein with reference to FIGS. 1-4. In some examples, AUL transmission may be referred to as grant-free transmissions or configured grant uplink (CG-UL) transmissions. For example, in LTE, an AUL transmission, grant-free transmission, or configured grant (CG-UL) transmission, may be a SPS transmission on resources allotted for autonomous or grant-free transmissions. In a mmW wireless communications system (e.g., a new radio (NR)), an AUL transmission or grant-free transmission may be a type II AUL transmission, where base station 105-*b* may SPS a UE 115-*d* or UE 115-*e* to perform AUL transmissions. Accordingly, a AUL transmission or uplink grant-free transmission may be referred to as a configured grant uplink (CG-UL) transmission.

At 505-*a*, base station 105-*b* may transmit a group physical control signaling, which may be received by UE 115-*d*. At 505-*b*, base station 105-*b* may transmit a group physical control signaling which may be received by UE 115-*e*. The group physical control signaling transmitted at 505-*a* and 505-*b* may be the same signaling transmitted within the same time and frequency resources, or may be different instances of the signaling transmitted within different time and frequency resources. The group physical control channel signaling may configure AULs for UE 115-*d* and UE 115-*e*. In some examples, the signaling may indicate a group physical control channel (e.g., a GC-PDCCH) that each UE in the group is to monitor for control messages, such as control message 525-*a* and control message 525-*b*. In some cases, the base station 105-*a* may use the group physical control channel signaling, RRC signaling, DCI signaling, or the like, to configure which field each UE 115 is to monitor. The group physical control signaling may further activate or deactivate AUL resources, and/or may allocate AUL resources for use by the group of UEs 115-*d* and 115-*e*.

At 510-*a* and 510-*b*, UE 115-*d* and UE 115-*e* may send AUL transmissions. The AUL transmissions may be in accordance with the group physical control channel signaling of 505- and 505-*b*. For example, the AUL transmissions may be transmitted within a resource allocation for AUL resources indicated by the group physical control channel signaling, using a modulation and coding scheme indicated by the group physical control channel signaling, or the like. An example of an AUL transmission may be an uplink grant-free (ULGF) transmission or configured grant uplink (CG-UL) transmission, and an example of which may be an LTE Type-I SPS transmission or type-II SPS transmission in NR.

At 515, base station 105-*b* may determine a control message to send one or both of UEs 115-*d* and 115-*e*. The control message may be based upon, for example, a number of UEs 115 configured to monitor the same field, whether AUL transmission 510-*a* and 510-*b* (e.g., CG-UL transmission) was successfully received, whether other AUL transmissions (e.g., CG-UL transmissions) were transmitted, successfully received, or retransmitted, and whether base station 105-*a* is experiencing congestion, or the like.

At 520-*a*, UE 115-*d* and UE 115-*e* may monitor one or more fields of the group physical control channel indicated by the group physical control channel signaling. UE 115-*d* and UE 115-*e* may determine the location of the fields to be monitored via explicit indication from the base station 105-*a* (e.g., base station 105-*b* may indicate specific resources for one or more fields in the signaling of 505, via RRC signaling, via DCI signaling, or the like). In some examples, UE 115-*d* and UE 115-*e* may be configured to monitor the same field. In some examples, UE 115-*d* and UE 115-*e* may be configured to monitor different fields, such that each field carries control messages specific to each UE 115.

In some examples, UE 115-*d* may identify the location of the field by applying an input to a hash function. The hash function may be previously known (e.g., preconfigured) or may be indicated via the group physical control channel signaling or other signaling. The input for the hash function may be previously known, or may be indicated via the signaling of 505. For example, the input may be a slot index in which the AUL transmission is transmitted, a transmission time of the AUL transmission (e.g., a first symbol period in which the AUL transmission is transmitted), an identifier of UE 115-*d*, an identifier of a HARQ process (e.g., an identifier of the HARQ process corresponding to the AUL transmission of 510) or any combination thereof.

Base station 105-*b* may transmit control message 525-*a* and control message 525-*b* on fields of the group physical control channel. In the case where UE 115-*d* and UE 115-*e* are monitoring the same field, control message 525-*a* and control message 525-*b* may be a single message for both UEs 115-*d*, 115-*e*. In the case where UE 115-*d* monitors a first field and UE 115-*e* monitors a second, different field, control message 525-*a* and control message 525-*b* may be distinct. The control message may be an ACK control message, a NACK control message, an ignore message, a suspend message, a resume message, an activate message, or an deactivate message, or the like.

At 530-*a*, UE 115-*d* may determine the status of a HARQ process of the AUL transmission of 510-*a*, based at least in part on the control message. At 530-*b*, UE 115-*e* may also determine the status of a HARQ process of the AUL transmission of 510-*b*, based at least in part on the control message. That is, UE 115-*d*, for example, may receive an ACK control message 525-*a*. The status of the HARQ process of AUL transmission 510-*a* may be complete due to receiving the ACK message. UE 115-*d* may determine not to retransmit AUL retransmission 535-*a*, based on the complete status of the HARQ process of AUL transmission 510-*a*. UE 115-e, for example, may receive a NACK control message 525-b. The status of the HARQ process of AUL transmission 510-b may be incomplete due to receiving the NACK message. UE 115-e may determine to transmit AUL transmission 535-b based on the incomplete status of the HARQ process of AUL transmission 510-b. If base station 105-b receives only one of AUL transmission 510-a or 510-b, base station 105-a may send a NACK control message if both UE 115-d and 115-d are configured to monitor the same field, and the HARQ status for both AUL transmission 510-a and 510-b may be determined to be incomplete. UE 115-d or UE 115-e may determine a HARQ status based on control messages 525-a and 525-b, which may be any of an ACK control message, an ignore message, a suspend message, a resume message, or the like.

At 535-a, UE 115-d may transmit an AUL retransmission based on the status of a HARQ process as determined at 530-a. For example, if control message 525-a is an ACK, or a suspend message, UE 115-d may determine not to transmit the AUL retransmission. However, if the control message 525-a is a NACK, an ignore, or a resume message, UE 115-d may determine to transmit AUL retransmission 535-a. Similarly, if control message 525-b is an ACK, or a suspend message, UE 115-e may determine not to transmit the AUL retransmission. However, if the control message 525-b is a NACK, an ignore, or a resume message, UE 115-e may determine to transmit AUL retransmission 535-b.

Beneficially, a base station as described herein may use a group physical control channel to manage a set of UEs configured to send AUL transmissions in a manner that improves throughput and manages network congestion.

Figure 6:
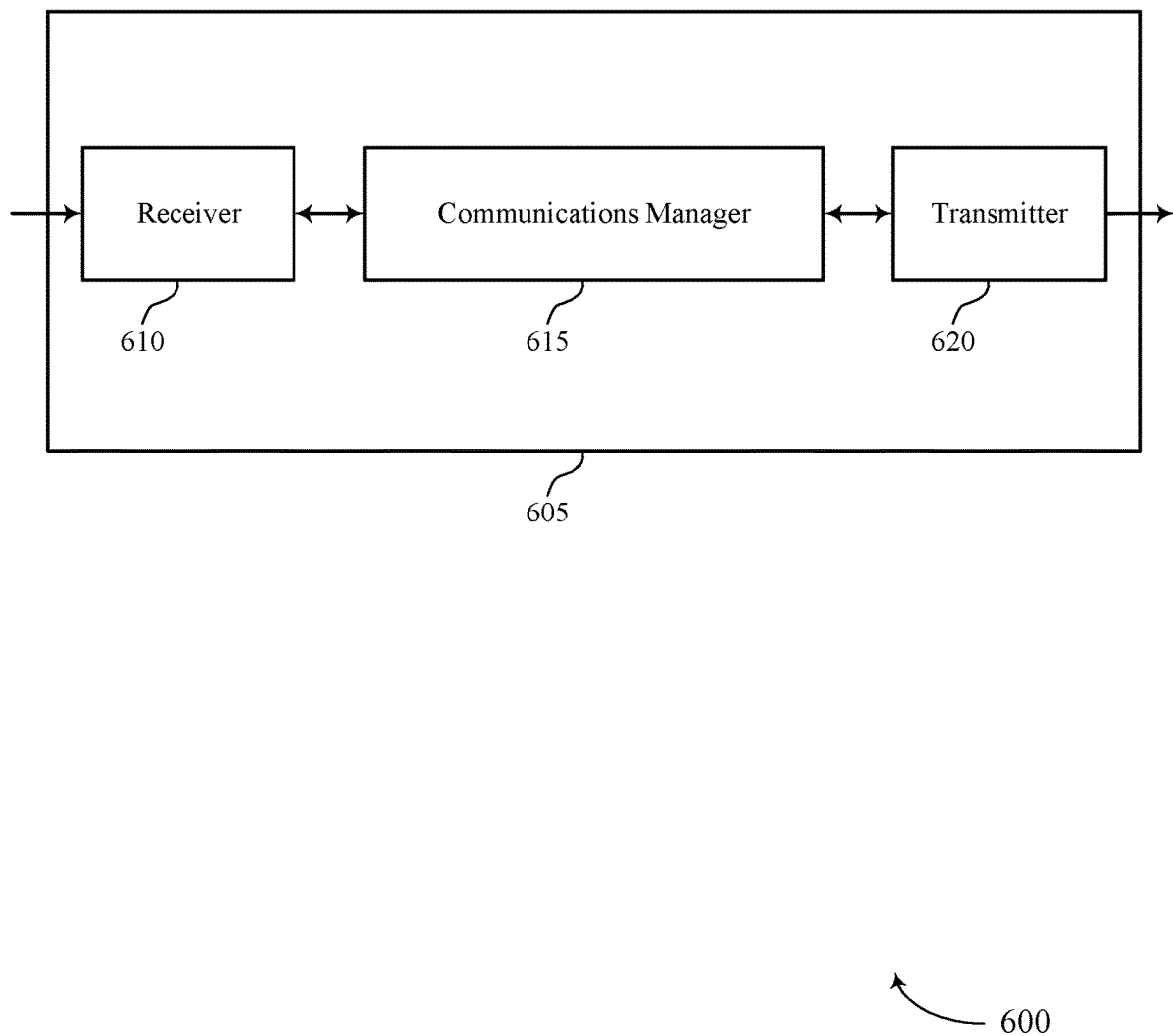
FIGS. 6 and 7 show block diagrams of devices that support group physical control channel for autonomous uplink transmissions in accordance with aspects of the present disclosure.

FIG. 6 shows a block diagram 600 of a device 605 that supports group physical control channel for autonomous uplink transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to group physical control channel for autonomous uplink transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive group physical control channel signaling that configures autonomous uplink transmissions (configured grant uplink transmissions) for a set of UEs that includes the UE and transmit an autonomous uplink transmission (e.g., configured grant uplink transmissions) in accordance with the group physical control channel signaling. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
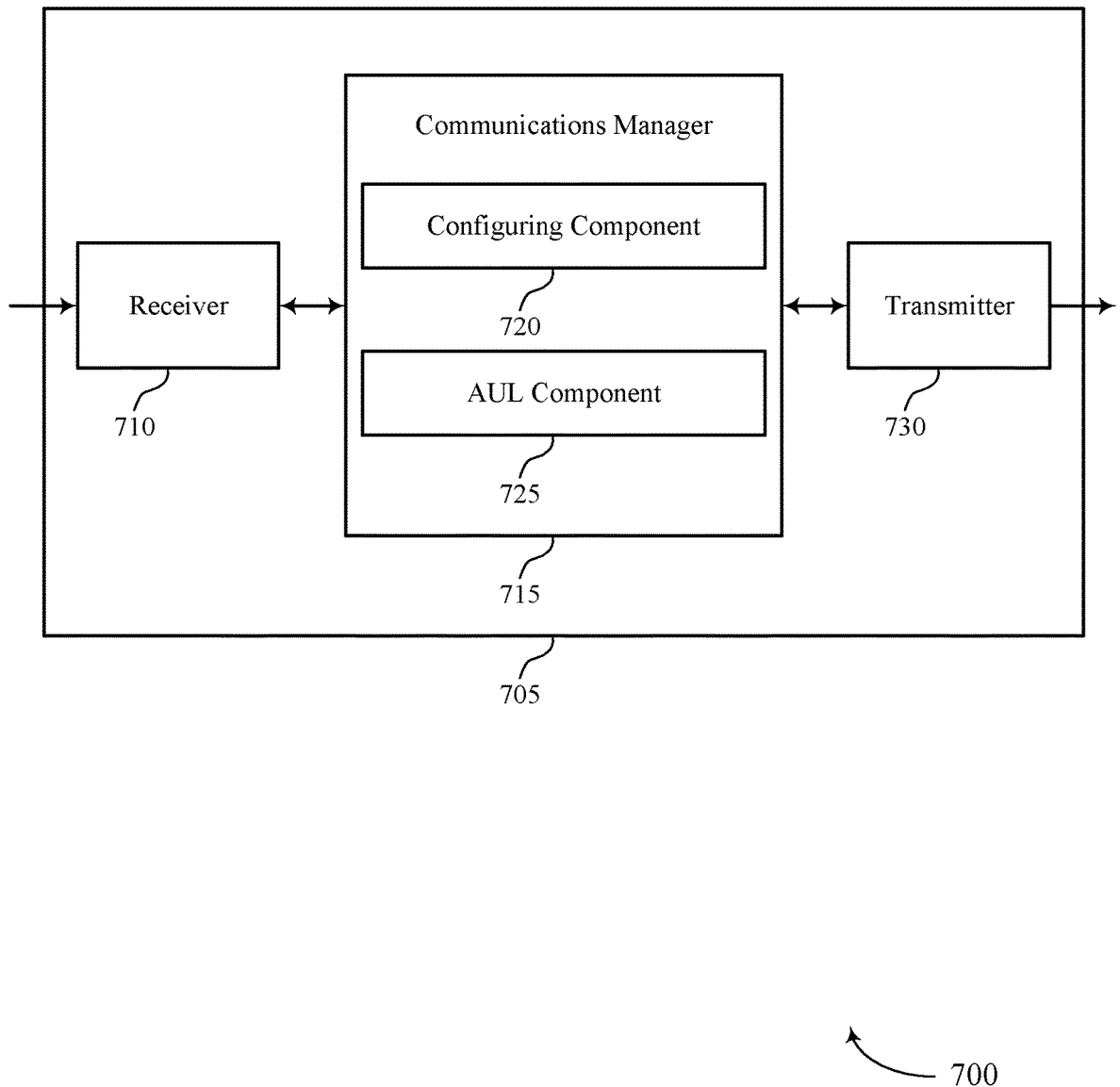

FIG. 7 shows a block diagram 700 of a device 705 that supports group physical control channel for autonomous uplink transmissions in accordance with aspects of the present disclosure. The device 705 may be an example of aspects of a device 605 or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to group physical control channel for autonomous uplink transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuring component 720 and an AUL component 725. The communications manager 715 may be an example of aspects of the communications manager 910 described herein.

The configuring component 720 may receive group physical control channel signaling that configures autonomous uplink transmissions (e.g., configured grant uplink transmissions) for a set of UEs that includes the UE.

The AUL component 725 may transmit an autonomous uplink transmission (e.g., a configured grant uplink transmission) in accordance with the group physical control channel signaling.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
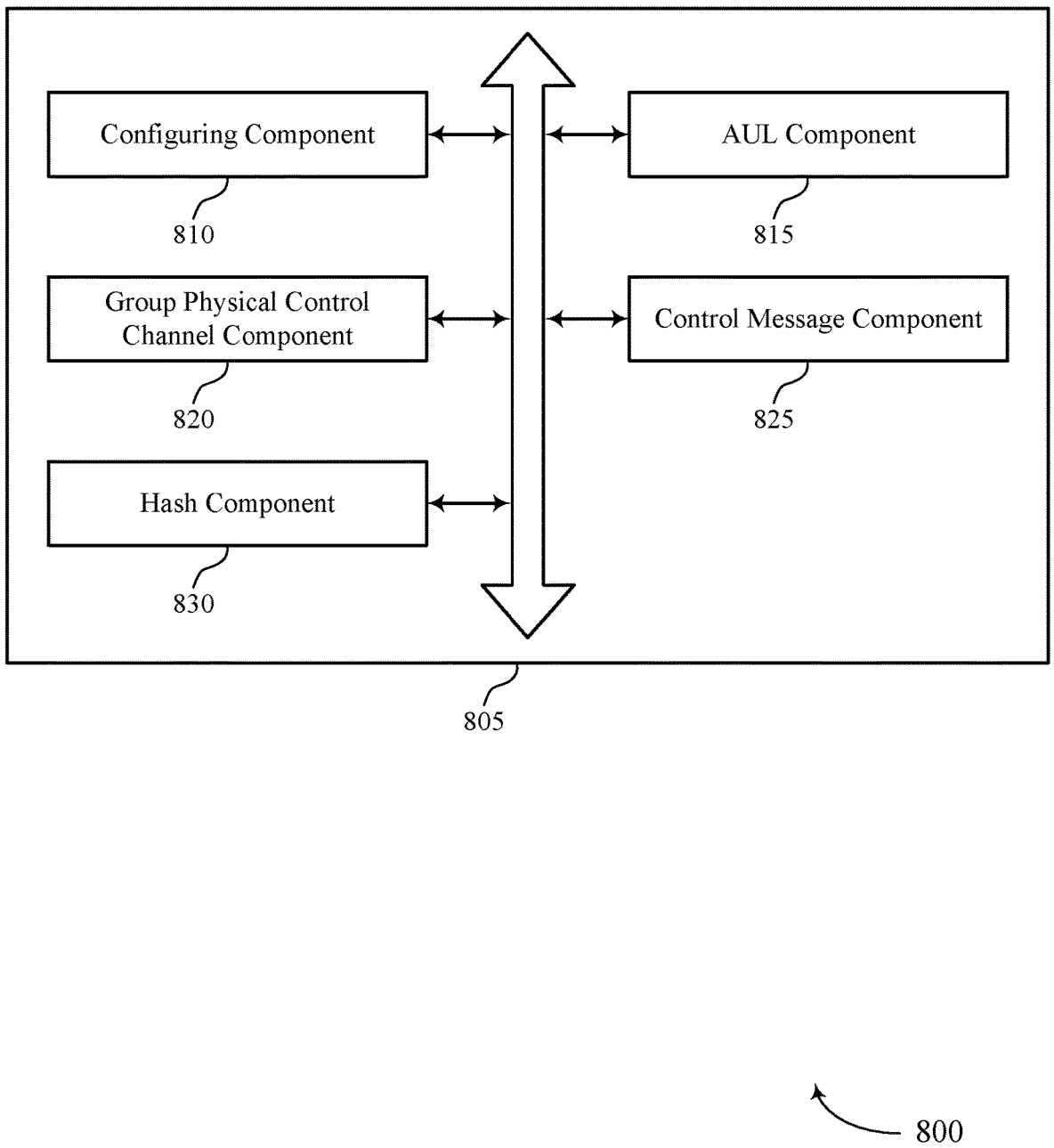
FIG. 8 shows a block diagram of a communications manager that supports group physical control channel for autonomous uplink transmissions in accordance with aspects of the present disclosure.

FIG. 8 shows a block diagram 800 of a communications manager 805 that supports group physical control channel for autonomous uplink transmissions in accordance with aspects of the present disclosure. The communications manager 805 may be an example of aspects of a communications manager 615, a communications manager 715, or a communications manager 910 described herein. The communications manager 805 may include a configuring component 810, an AUL component 815, a group physical control channel component 820, a control message component 825, and a hash component 830. Each of these modules may communicate, directly or indirectly, with one another (e.g., via one or more buses).

The configuring component 810 may receive group physical control channel signaling that configures autonomous uplink transmissions (e.g., configured grant uplink transmissions) for a set of UEs that includes the UE.

The AUL component 815 may transmit an autonomous uplink transmission (e.g., a configured grant uplink transmission) in accordance with the group physical control channel signaling. In some examples, the AUL component 815 may determine not to transmit a retransmission of the autonomous uplink transmission (e.g., a configured grant uplink transmission) based on the acknowledgment message. In some examples, the AUL component 815 may transmit a retransmission of the autonomous uplink transmission (e.g., the configured grant uplink transmission) based on the negative acknowledgment message.

The group physical control channel component 820 may identify a field within the group physical control channel based on the group physical control channel signaling. In some cases, the group physical control channel signaling indicates a group physical control channel.

The control message component 825 may receive a control message in the group physical control channel based on the autonomous uplink transmission (e.g., the configured grant uplink transmission). In some examples, the control message component 825 may receive an acknowledgment message in the group physical control channel based on the autonomous uplink transmission. In some examples, the control message component 825 may receive an activate message in the group physical control channel indicating that autonomous uplink transmission resources are active. In some examples, a type II SPS AUL transmission (e.g., in an NR environment) may be controlled by a unicast control message. If a UE 115 receives both a unicast control message and a multi-cast control message and/or a broadcast control message, the UE 115 may assume that the unicast control message takes precedence over the multi-cast control message and the broadcast control message.

In some examples, the control message component 825 may receive a deactivate message in the group physical control channel indicating that autonomous uplink transmission resources (e.g., the configured grant uplink transmission resources) are inactive. In some examples, the control message component 825 may receive a suspend message in the group physical control channel indicating to suspend subsequent autonomous uplink transmissions. In some examples, the control message component 825 may receive a resume message in the group physical control channel indicating to resume autonomous uplink transmissions (e.g., configured grant uplink transmissions). In some examples, the control message component 825 may receive a negative acknowledgment message in the group physical control channel based on the autonomous uplink transmission. In some examples, the control message component 825 may receive an acknowledgment message or a negative acknowledge message corresponding to the autonomous uplink transmission in the first field. In some examples, the control message component 825 may receive an acknowledgment message or a negative acknowledge message in the second field corresponding to a second autonomous uplink transmission. In some examples, the control message component 825 may receive an ignore message in the group physical control channel indicating to ignore the group physical control channel.

The hash component 830 may apply an input to a hash function to identify a field within the group physical control channel. In some examples, the hash component 830 may decode the field to obtain a control message. In some examples, the hash component 830 may apply an identifier of a first HARQ process to a hash function to identify a first field within the group physical control channel. In some examples, the hash component 830 may apply an identifier of a second HARQ process to the hash function to identify a second field within the group physical control channel. In some cases, the input is a slot index associated with the autonomous uplink transmission, or a transmission time of the autonomous uplink transmission, or an identifier of the UE, or an identifier of a HARQ process, or any combination thereof.

Figure 9:
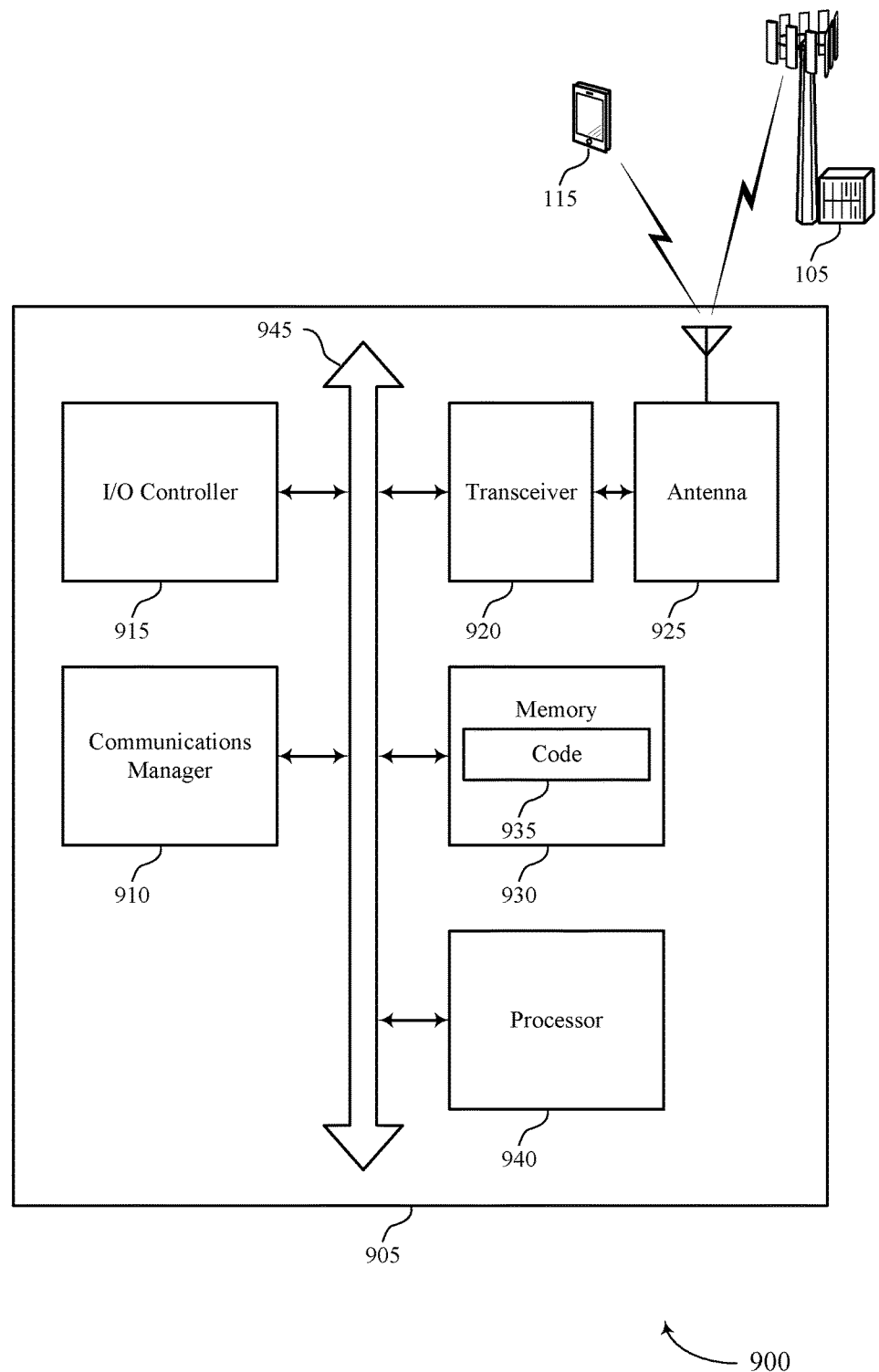
FIG. 9 shows a diagram of a system including a device that supports group physical control channel for autonomous uplink transmissions in accordance with aspects of the present disclosure.

FIG. 9 shows a diagram of a system 900 including a device 905 that supports group physical control channel for autonomous uplink transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive group physical control channel signaling that configures autonomous uplink transmissions for a set of UEs that includes the UE and transmit an autonomous uplink transmission in accordance with the group physical control channel signaling.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting group physical control channel for autonomous uplink transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
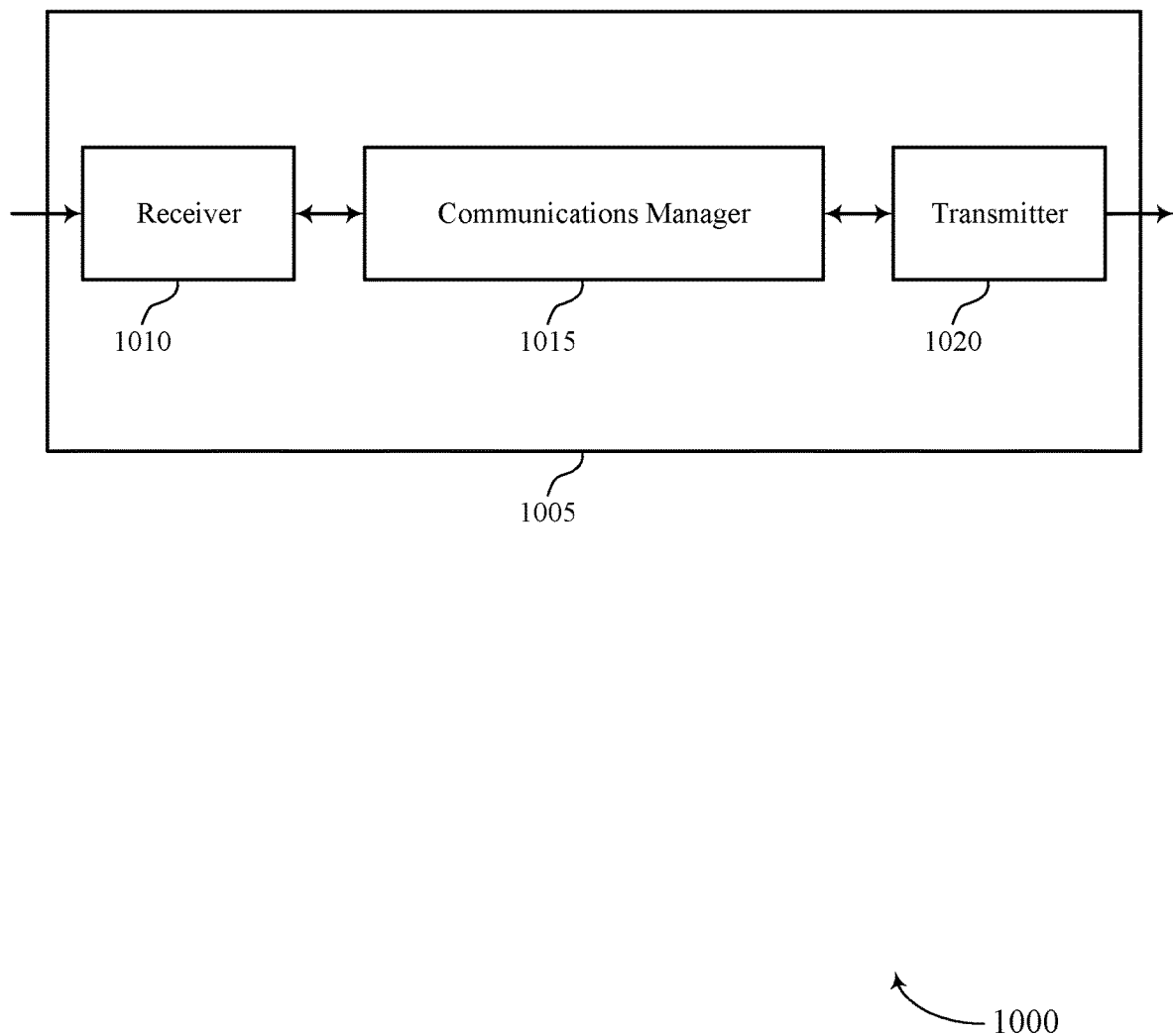
FIGS. 10 and 11 show block diagrams of devices that support group physical control channel for autonomous uplink transmissions in accordance with aspects of the present disclosure.

FIG. 10 shows a block diagram 1000 of a device 1005 that supports group physical control channel for autonomous uplink transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to group physical control channel for autonomous uplink transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit group physical control channel signaling that configures autonomous uplink transmissions (e.g., configured grant uplink transmissions) for a set of user equipments (UEs) and receive an autonomous uplink transmission (e.g., the configured grant uplink transmission) in accordance with the group physical control channel signaling. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
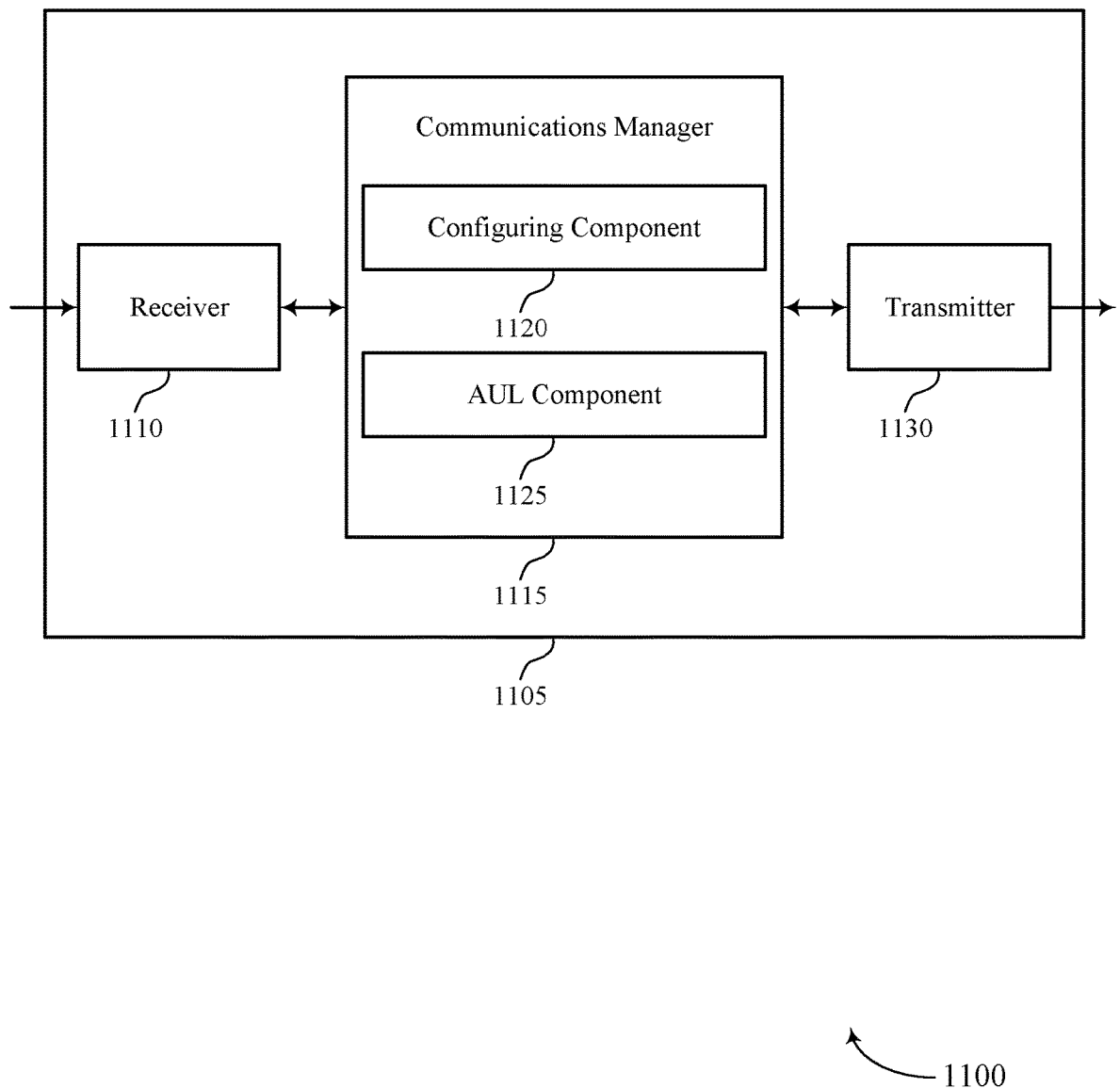

FIG. 11 shows a block diagram 1100 of a device 1105 that supports group physical control channel for autonomous uplink transmissions in accordance with aspects of the present disclosure. The device 1105 may be an example of aspects of a device 1005 or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to group physical control channel for autonomous uplink transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuring component 1120 and an AUL component 1125. The communications manager 1115 may be an example of aspects of the communications manager 1310 described herein.

The configuring component 1120 may transmit group physical control channel signaling that configures autonomous uplink transmissions (e.g., configured grant uplink transmissions) for a set of user equipments (UEs).

The AUL component 1125 may receive an autonomous uplink transmission (e.g., the configured grant uplink transmission) in accordance with the group physical control channel signaling.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
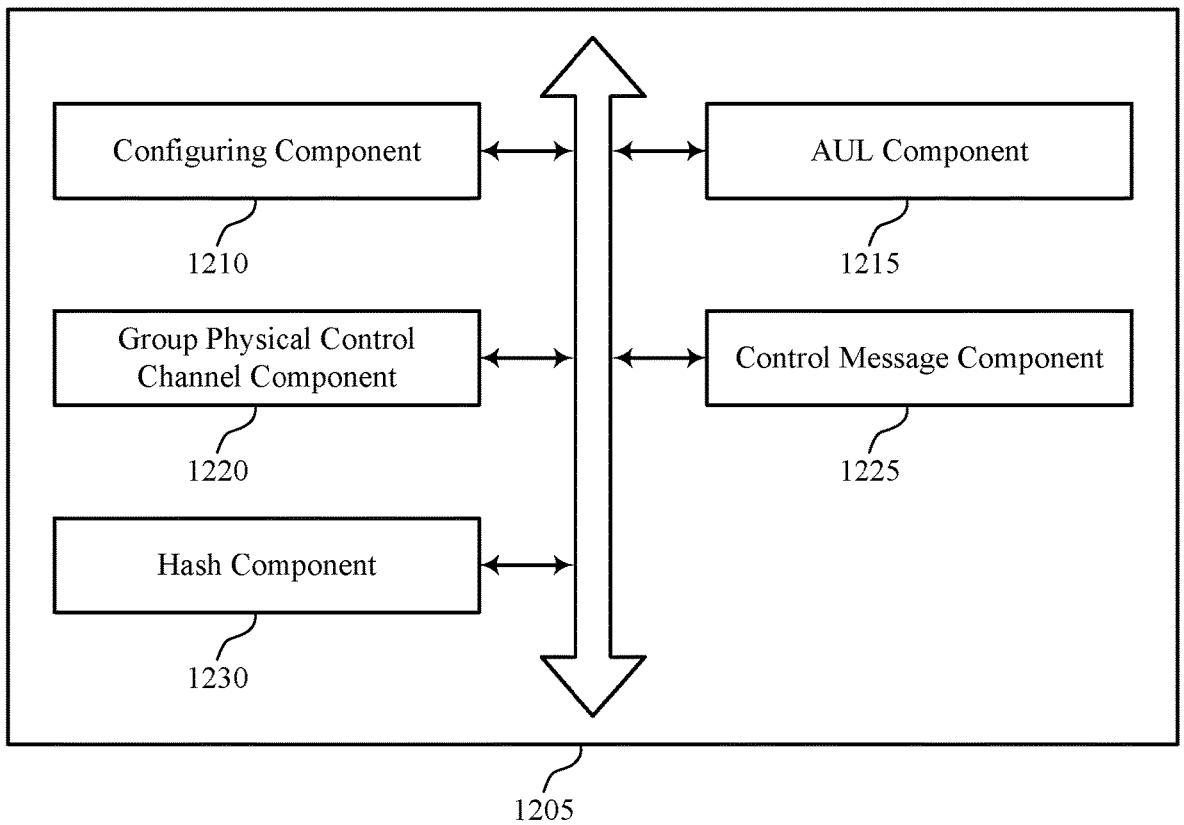
FIG. 12 shows a block diagram of a communications manager that supports group physical control channel for autonomous uplink transmissions in accordance with aspects of the present disclosure.

FIG. 12 shows a block diagram 1200 of a communications manager 1205 that supports group physical control channel for autonomous uplink transmissions in accordance with aspects of the present disclosure. The communications manager 1205 may be an example of aspects of a communications manager 1015, a communications manager 1115, or a communications manager 1310 described herein. The communications manager 1205 may include a configuring component 1210, an AUL component 1215, a group physical control channel component 1220, a control message component 1225, and a hash component 1230. Each of these modules may communicate, directly or indirectly, with one another (e.g., via one or more buses).

The configuring component 1210 may transmit group physical control channel signaling that configures autonomous uplink transmissions for a set of user equipments (UEs). In some examples, the configuring component 1210 may configure a first UE and a second UE of the set of UEs to monitor a field within the group physical control channel.

The AUL component 1215 may receive an autonomous uplink transmission in accordance with the group physical control channel signaling. In some examples, the AUL component 1215 may receive a retransmission of the autonomous uplink transmission based on the negative acknowledgment message. In some examples, the AUL component 1215 may receive a second autonomous uplink transmission from the second UE within a time period in which the autonomous uplink transmission is received from the first UE.

The group physical control channel component 1220 may determine that the field of the group physical control channel is jointly assigned to provide feedback to each of the first UE and the second UE. In some cases, the group physical control channel signaling indicates a group physical control channel.

The control message component 1225 may transmit a control message in the group physical control channel based on the autonomous uplink transmission. In some examples, the control message component 1225 may transmit an acknowledgment message in the group physical control channel based on the autonomous uplink transmission. In some examples, the control message component 1225 may transmit an activate message in the group physical control channel indicating that autonomous uplink transmission resources are active. In some examples, the control message component 1225 may transmit a deactivate message in the group physical control channel indicating that autonomous uplink transmission resources are inactive.

In some examples, the control message component 1225 may transmit a suspend message in the group physical control channel indicating to suspend subsequent autonomous uplink transmissions. In some examples, the control message component 1225 may transmit a resume message in the group physical control channel indicating to resume autonomous uplink transmissions. In some examples, the control message component 1225 may transmit an ignore message in the group physical control channel indicating to ignore the group physical control channel. In some examples, the control message component 1225 may transmit a negative acknowledgment message in the group physical control channel based on the autonomous uplink transmission. In some examples, the control message component 1225 may transmit a control message in a field within the group physical control channel based on the group physical control channel signaling. In some examples, the control message component 1225 may transmit a control message in the field. In some examples, the control message component 1225 may transmit an acknowledgment or a negative acknowledge message corresponding to the autonomous uplink transmission in the first field. In some examples, the control message component 1225 may transmit an acknowledgment or a negative acknowledge message in the second field corresponding to a second autonomous uplink transmission. In some examples, the control message component 1225 may transmit an acknowledgment message or a negative acknowledge message based on whether decoding of the autonomous uplink transmission and the second autonomous uplink transmission is successful. In some cases, the acknowledgment message is transmitted if decoding of both of the autonomous uplink transmission and the second autonomous uplink transmission is successful, and the negative acknowledgment message is transmitted if decoding of either or both of the autonomous uplink transmission and the second autonomous uplink transmission is unsuccessful.

The hash component 1230 may apply an input to a hash function to identify a field within the group physical control channel. In some examples, the hash component 1230 may apply an identifier of a first HARQ process to a hash function to identify a first field within the group physical control channel. In some examples, the hash component 1230 may apply an identifier of a second HARQ process to the hash function to identify a second field within the group physical control channel. In some cases, the input is a slot index associated with the autonomous uplink transmission, or a transmission time of the autonomous uplink transmission, or an identifier of the UE, or an identifier of a HARQ process, or any combination thereof.

Figure 13:
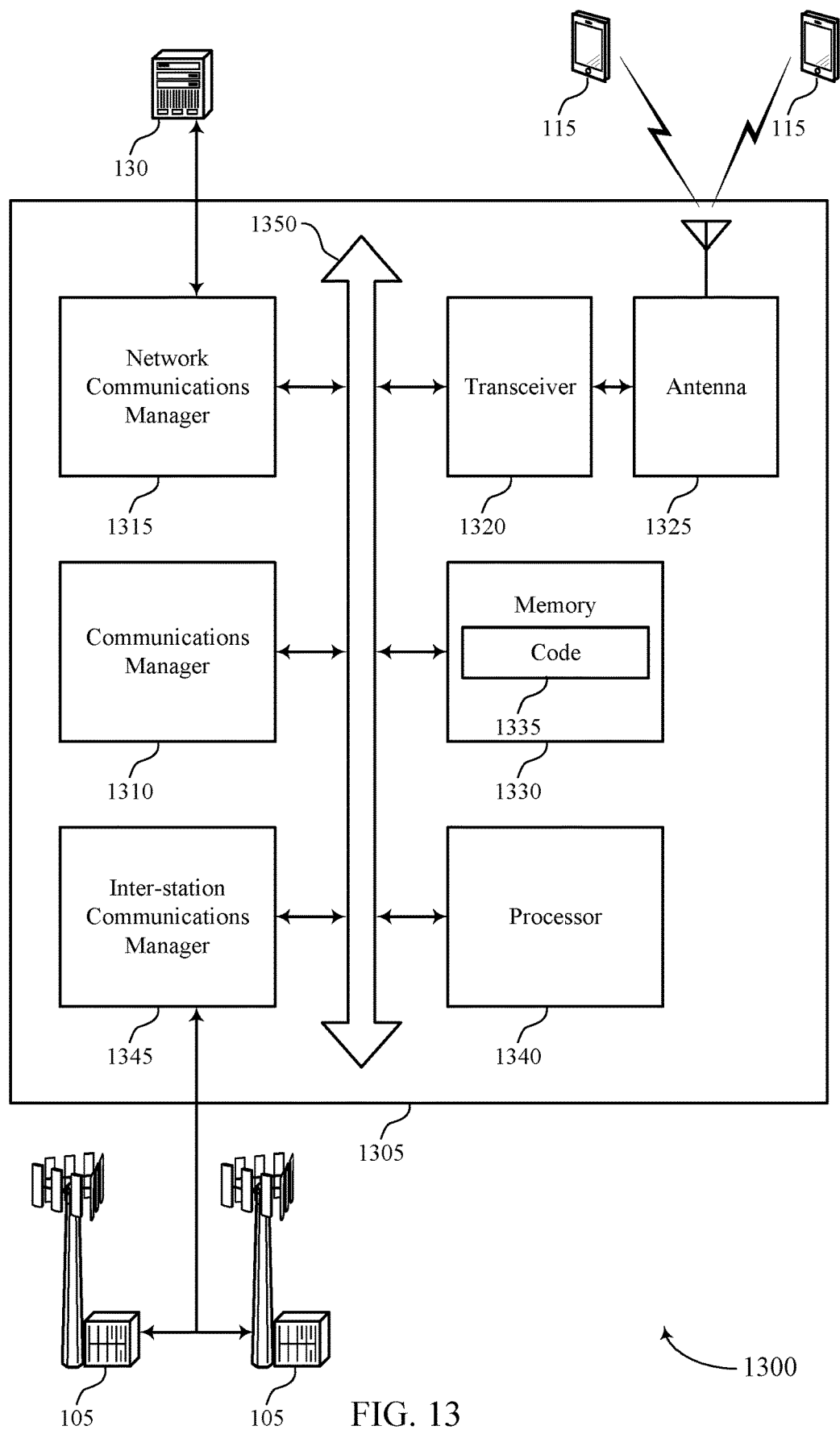
FIG. 13 shows a diagram of a system including a device that supports group physical control channel for autonomous uplink transmissions in accordance with aspects of the present disclosure.

FIG. 13 shows a diagram of a system 1300 including a device 1305 that supports group physical control channel for autonomous uplink transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit group physical control channel signaling that configures autonomous uplink transmissions for a set of user equipments (UEs) and receive an autonomous uplink transmission in accordance with the group physical control channel signaling.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting group physical control channel for autonomous uplink transmissions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
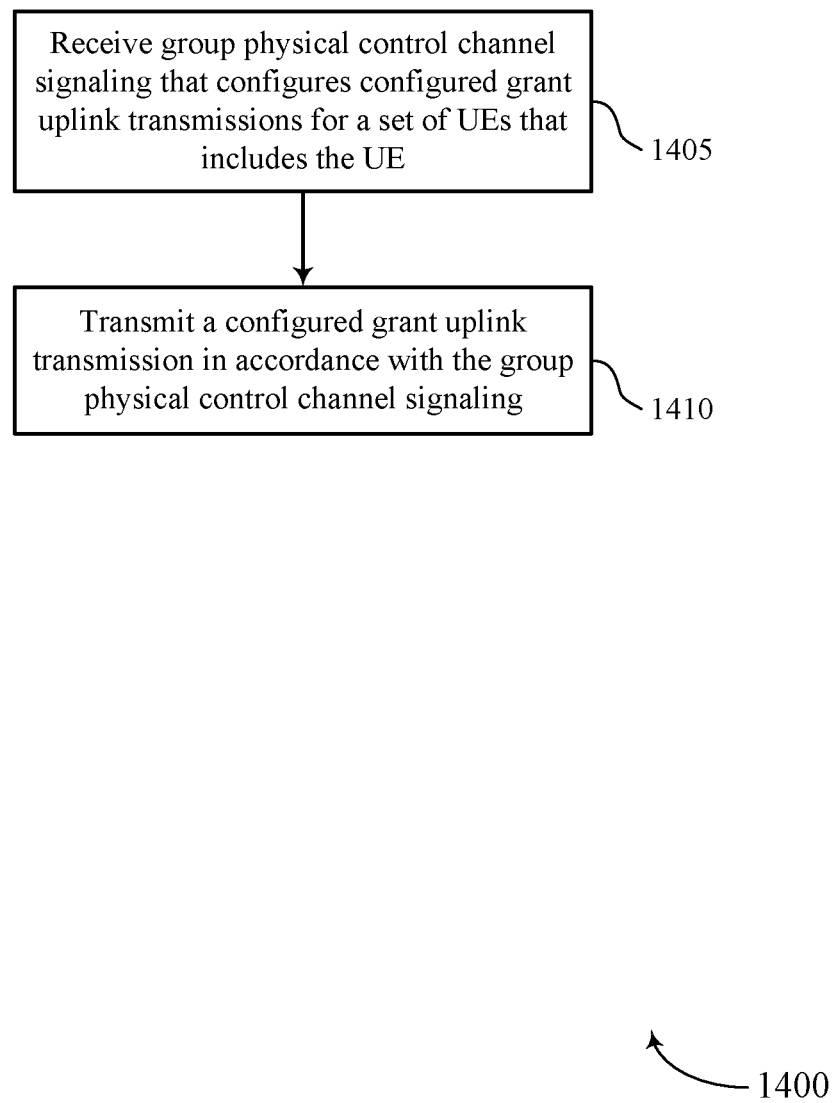
FIGS. 14 through 17 show flowcharts illustrating methods that support group physical control channel for autonomous uplink transmissions in accordance with aspects of the present disclosure.

FIG. 14 shows a flowchart illustrating a method 1400 that supports group physical control channel for autonomous uplink transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive group physical control channel signaling that configures configured grant uplink transmissions (e.g., autonomous uplink transmissions) for a set of UEs that includes the UE. The operations of 1405 may be performed according to the methods described herein. In some examples, aspects of the operations of 1405 may be performed by a configuring component as described with reference to FIGS. 6 through 9.

At 1410, the UE may transmit a configured grant uplink transmission in accordance with the group physical control channel signaling. The operations of 1410 may be performed according to the methods described herein. In some examples, aspects of the operations of 1410 may be performed by an AUL component as described with reference to FIGS. 6 through 9.

Figure 15:
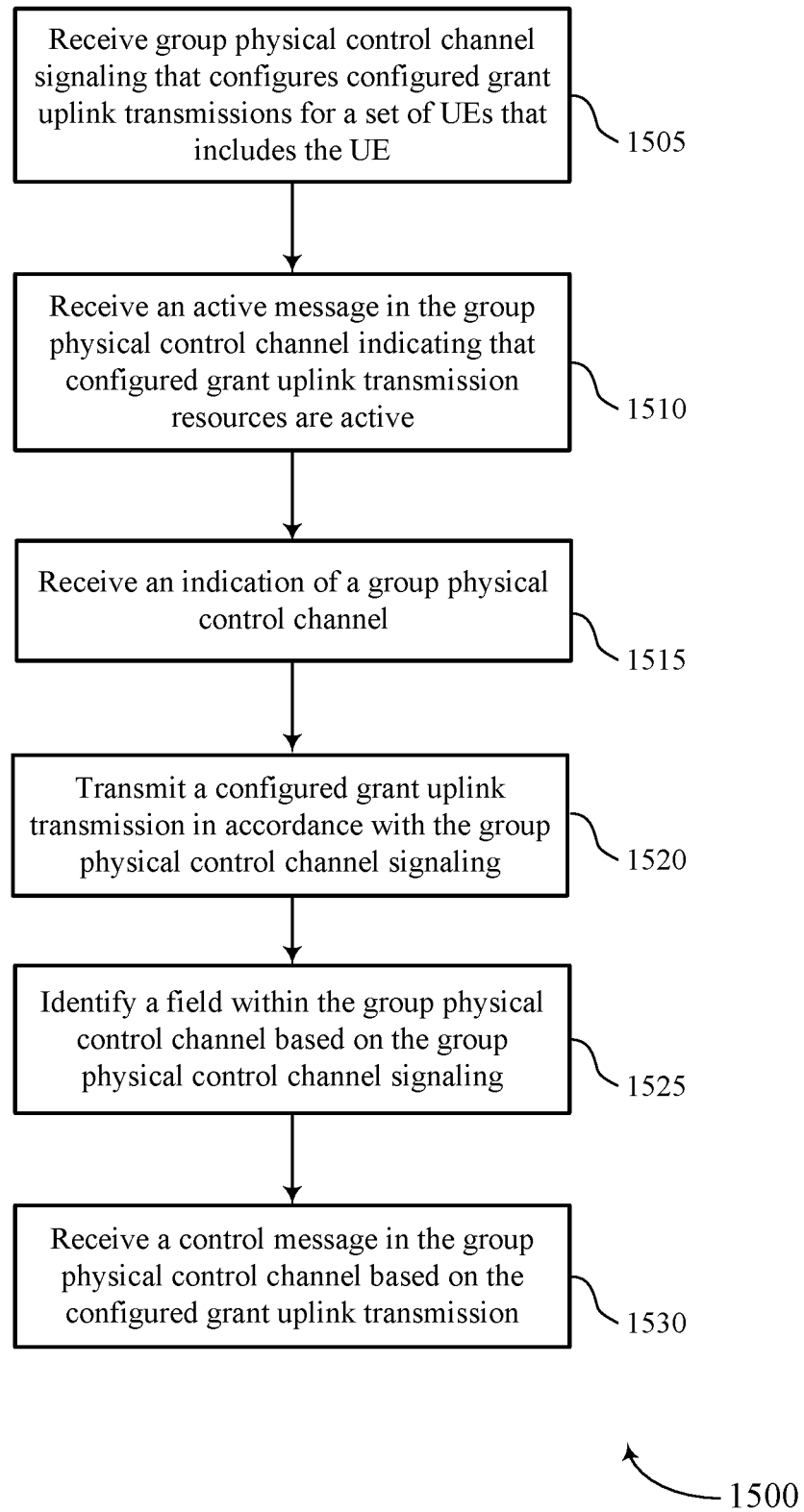

FIG. 15 shows a flowchart illustrating a method 1500 that supports group physical control channel for autonomous uplink transmissions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive group physical control channel signaling that configures configured grant uplink transmissions (e.g., autonomous uplink transmissions) for a set of UEs that includes the UE. The operations of 1505 may be performed according to the methods described herein. In some examples, aspects of the operations of 1505 may be performed by a configuring component as described with reference to FIGS. 6 through 9.

At 1510, the UE may receive an activate message in the group physical control channel indicating that configured grant uplink resources (e.g., autonomous uplink transmission resources) are active. The operations of 1510 may be performed according to the methods described herein. In some examples, aspects of the operations of 1510 may be performed by a control message component as described with reference to FIGS. 6 through 9.

At 1515, the UE may receive an indication of a group physical control channel. The operations of 1515 may be performed according to the methods described herein. In some examples, aspects of the operations of 1515 may be performed by an AUL component as described with reference to FIGS. 6 through 9.

At 1520, the UE may transmit a configured grant uplink transmission in accordance with the group physical control channel signaling. The operations of 1520 may be performed according to the methods described herein. In some examples, aspects of the operations of 1520 may be performed by a group physical control channel component as described with reference to FIGS. 6 through 9.

At 1525, the UE may identify a field within the group physical control channel based on the group physical control channel signaling. The operations of 1525 may be performed according to the methods described herein. In some examples, aspects of the operations of 1525 may be performed by a group physical control channel component as described with reference to FIGS. 6 through 9.

At 1530, the UE may receive a control message in the group physical control channel based on the configured grant uplink transmission. The operations of 1530 may be performed according to the methods described herein. In some examples, aspects of the operations of 1530 may be performed by a control message component as described with reference to FIGS. 6 through 9.

Figure 16:
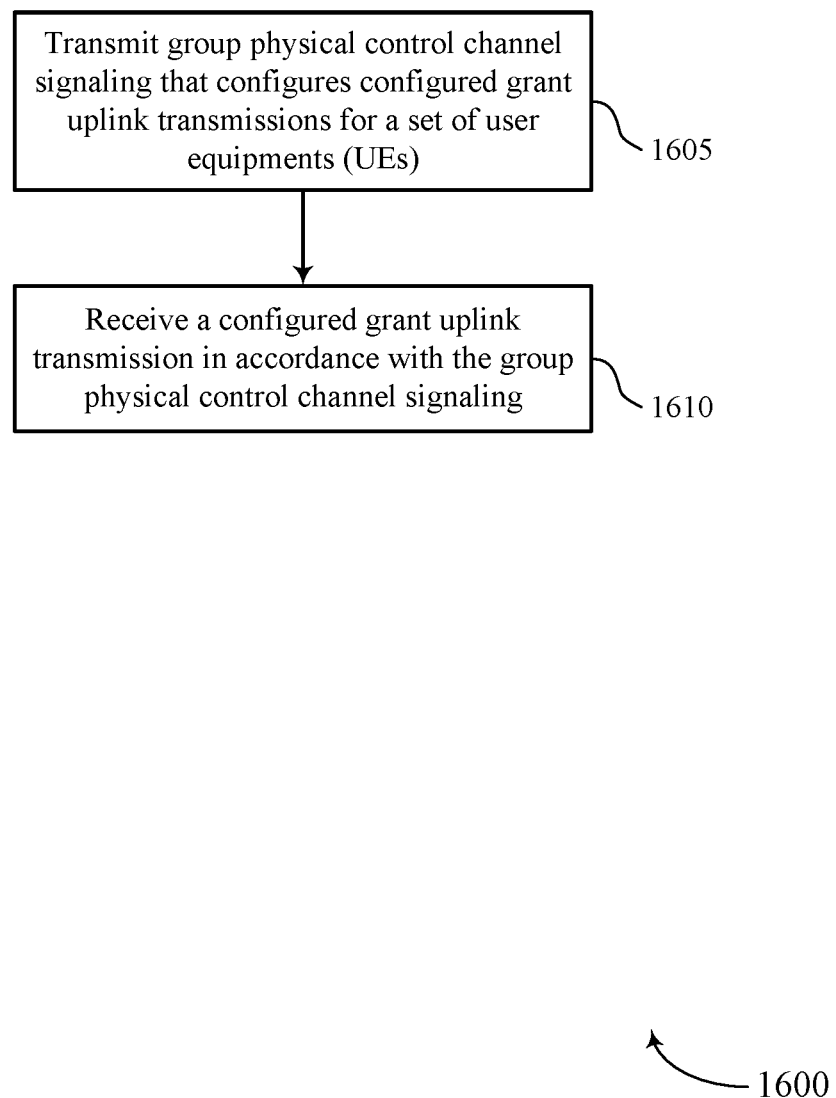

FIG. 16 shows a flowchart illustrating a method 1600 that supports group physical control channel for autonomous uplink transmissions in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit group physical control channel signaling that configures configured grant uplink transmissions (e.g., autonomous uplink transmissions) for a set of user equipments (UEs). The operations of 1605 may be performed according to the methods described herein. In some examples, aspects of the operations of 1605 may be performed by a configuring component as described with reference to FIGS. 10 through 13.

At 1610, the base station may receive a configured grant uplink transmission in accordance with the group physical control channel signaling. The operations of 1610 may be performed according to the methods described herein. In some examples, aspects of the operations of 1610 may be performed by an AUL component as described with reference to FIGS. 10 through 13.

Figure 17:
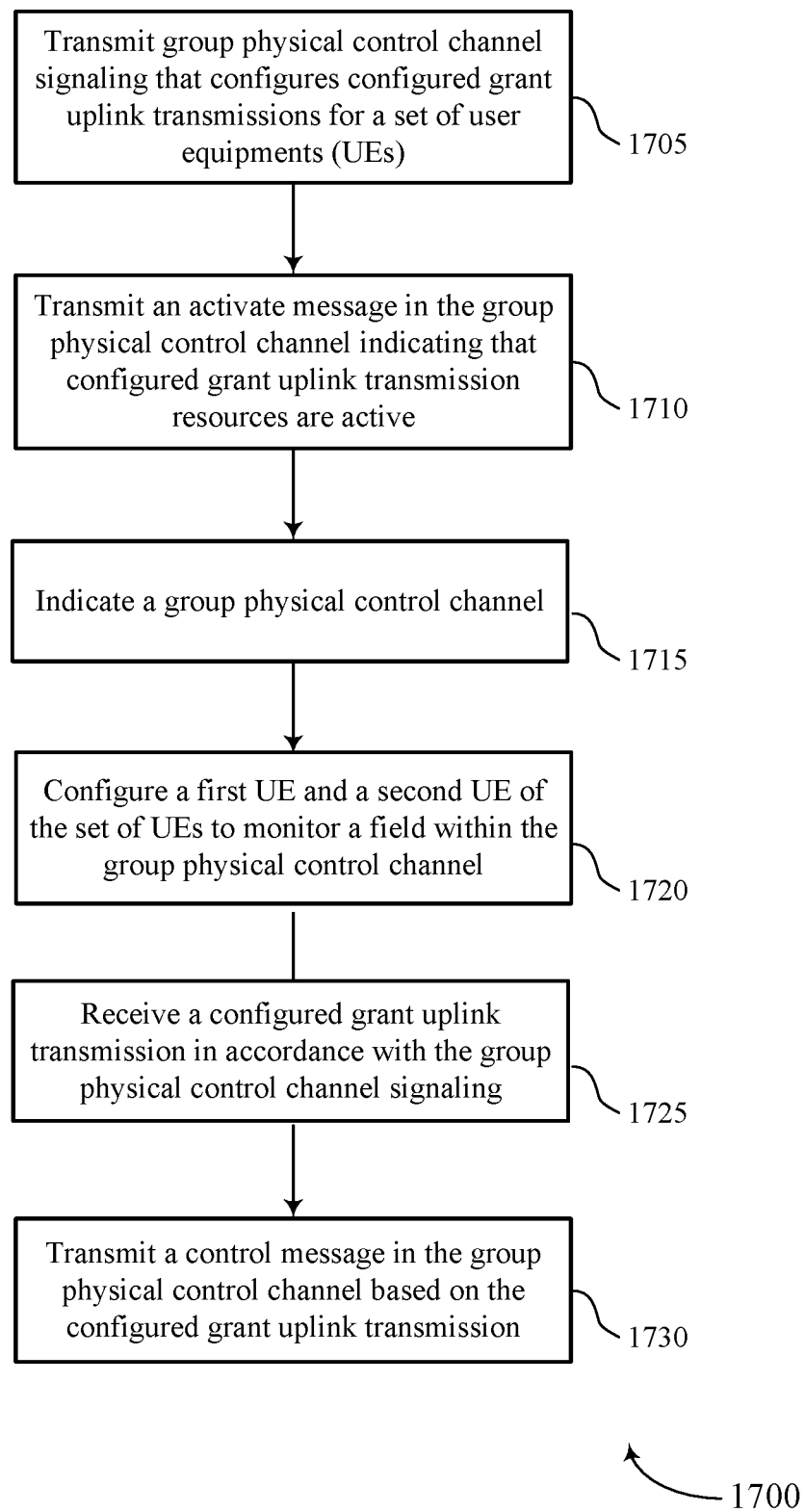

FIG. 17 shows a flowchart illustrating a method 1700 that supports group physical control channel for autonomous uplink transmissions in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit group physical control channel signaling that configures configured grant uplink transmissions (e.g., autonomous uplink transmissions) for a set of user equipments (UEs). The operations of 1705 may be performed according to the methods described herein. In some examples, aspects of the operations of 1705 may be performed by a configuring component as described with reference to FIGS. 10 through 13.

At 1710, the base station may transmit an activate message in the group physical control channel indicating that configured grant uplink transmission resources (e.g., autonomous uplink transmission resources) are active. The operations of 1710 may be performed according to the methods described herein. In some examples, aspects of the operations of 1710 may be performed by a control message component as described with reference to FIGS. 10 through 13.

At 1715, the base station may indicate a group physical control channel. The operations of 1715 may be performed according to the methods described herein. In some examples, aspects of the operations of 1715 may be performed by a configuring component as described with reference to FIGS. 10 through 13.

At 1720, the base station may configure a first UE and a second UE of the set of UEs to monitor a field within the group physical control channel. The operations of 1720 may be performed according to the methods described herein. In some examples, aspects of the operations of 1720 may be performed by an AUL component as described with reference to FIGS. 10 through 13.

At 1725, the base station may receive a configured grant uplink transmission (e.g., an autonomous uplink transmission) in accordance with the group physical control channel signaling. The operations of 1725 may be performed according to the methods described herein. In some examples, aspects of the operations of 1725 may be performed by a group physical control channel component as described with reference to FIGS. 10 through 13.

At 1730, the base station may transmit a control message in the group physical control channel based on the configured grant uplink transmission. The operations of 1730 may be performed according to the methods described herein. In some examples, aspects of the operations of 1730 may be performed by a control message component as described with reference to FIGS. 10 through 13.

Embodiment 1

A method of wireless communication at a user equipment (UE), comprising: receiving group physical control channel signaling that configures configured grant uplink transmissions for a set of UEs that includes the UE; and transmitting a configured grant uplink transmission in accordance with the group physical control channel signaling.

Embodiment 2

The method of embodiment 1, wherein the group physical control channel signaling indicates a group physical control channel.

Embodiment 3

The method of embodiment 2, further comprising: receiving a control message in the group physical control channel based at least in part on the configured grant uplink transmission.

Embodiment 4

The method of any of embodiments 2 to 3, further comprising: receiving an acknowledgment message in the group physical control channel based at least in part on the configured grant uplink transmission; and determining not to transmit a retransmission of the configured grant uplink transmission based at least in part on the acknowledgment message.

Embodiment 5

The method of any of embodiments 2 to 4, further comprising: receiving an activate message in the group physical control channel indicating that configured grant uplink transmission resources are active.

Embodiment 6

The method of any of embodiments 2 to 5, further comprising: receiving a deactivate message in the group physical control channel indicating that configured grant uplink transmission resources are inactive.

Embodiment 7

The method of any of embodiments 2 to 6, further comprising: receiving a negative acknowledgment message in the group physical control channel based at least in part on the configured grant uplink transmission; and transmitting a retransmission of the configured grant uplink transmission based at least in part on the negative acknowledgment message.

Embodiment 8

The method of any of embodiments 2 to 7, further comprising: identifying a field within the group physical control channel based at least in part on the group physical control channel signaling.

Embodiment 9

The method of any of embodiments 2 to 8, further comprising: applying an input to a hash function to identify a field within the group physical control channel; and decoding the field to obtain a control message.

Embodiment 10

The method of embodiment 9, wherein the input is a slot index associated with the configured grant uplink transmission, or a transmission time of the configured grant uplink transmission, or an identifier of the UE, or an identifier of a hybrid automatic repeat request (HARQ) process, or any combination thereof.

Embodiment 11

The method of any of embodiments 2 to 10, further comprising: applying an identifier of a first hybrid automatic repeat request (HARQ) process to a hash function to identify a first field within the group physical control channel; and applying an identifier of a second HARQ process to the hash function to identify a second field within the group physical control channel.

Embodiment 12

The method of embodiment 11, further comprising: receiving an acknowledgment message or a negative acknowledge message corresponding to the configured grant uplink transmission in the first field; and receiving an acknowledgment message or a negative acknowledge message in the second field corresponding to a second configured grant uplink transmission.

Embodiment 13

The method of any of embodiments 1 to 12, further comprising: receiving an ignore message in the group physical control channel indicating to ignore the group physical control channel.

Embodiment 14

A method for wireless communication at a base station, comprising: transmitting group physical control channel signaling that configures configured grant uplink transmissions for a set of user equipments (UEs); and receiving a configured grant uplink transmission in accordance with the group physical control channel signaling.

Embodiment 15

The method of embodiment 14, wherein the group physical control channel signaling indicates a group physical control channel.

Embodiment 16

The method of embodiment 15, further comprising: transmitting a control message in the group physical control channel based at least in part on the configured grant uplink transmission.

Embodiment 17

The method of any of embodiments 15 to 16, further comprising: transmitting an acknowledgment message in the group physical control channel based at least in part on the configured grant uplink transmission.

Embodiment 18

The method of any of embodiments 15 to 17, further comprising: transmitting an activate message in the group physical control channel indicating that configured grant uplink transmission resources are active.

Embodiment 19

The method of any of embodiments 15 to 18, further comprising: transmitting a deactivate message in the group physical control channel indicating that configured grant uplink transmission resources are inactive.

Embodiment 20

The method of any of embodiments 15 to 19, further comprising: transmitting an ignore message in the group physical control channel indicating to ignore the group physical control channel.

Embodiment 21

The method of any of embodiments 15 to 20, further comprising: transmitting a negative acknowledgment message in the group physical control channel based at least in part on the configured grant uplink transmission; and receiving a retransmission of the configured grant uplink transmission based at least in part on the negative acknowledgment message.

Embodiment 22

The method of any of embodiments 15 to 21, further comprising: transmitting a control message in a field within the group physical control channel based at least in part on the group physical control channel signaling.

Embodiment 23

The method of any of embodiments 15 to 22, further comprising: applying an input to a hash function to identify a field within the group physical control channel; and transmitting a control message in the field.

Embodiment 24

The method of embodiment 23, wherein the input is a slot index associated with the configured grant uplink transmission, or a transmission time of the configured grant uplink transmission, or an identifier of the UE, or an identifier of a hybrid automatic repeat request (HARQ) process, or any combination thereof.

Embodiment 25

The method of any of embodiments 15 to 24, further comprising: applying an identifier of a first hybrid automatic repeat request (HARQ) process to a hash function to identify a first field within the group physical control channel; and applying an identifier of a second HARQ process to the hash function to identify a second field within the group physical control channel.

Embodiment 26

The method of embodiment 25, further comprising: transmitting an acknowledgment or a negative acknowledge message corresponding to the configured grant uplink transmission in the first field; and transmitting an acknowledgment or a negative acknowledge message in the second field corresponding to a second configured grant uplink transmission.

Embodiment 27

The method of any of embodiments 15 to 26, further comprising: configuring a first UE and a second UE of the set of UEs to monitor a field within the group physical control channel.

Embodiment 28

The method of embodiment 27, further comprising: receiving a second configured grant uplink transmission from the second UE within a time period in which the configured grant uplink transmission is received from the first UE; determining that the field of the group physical control channel is jointly assigned to provide feedback to each of the first UE and the second UE; and transmitting an acknowledgment message or a negative acknowledge message based at least in part on whether decoding of the configured grant uplink transmission and the second configured grant uplink transmission is successful.

Embodiment 29

An apparatus comprising at least one means for performing a method of any of embodiments 1 to 28.

Embodiment 30

An apparatus comprising a processor; memory in electronic communication with the processor; and instructions stored in the memory and executable by the processor to cause the apparatus to perform a method of any of embodiments 1 to 28.

Embodiment 31

A non-transitory computer-readable medium storing code for wireless communications, the code comprising instructions executable by a processor to perform a method of any of embodiments 1 to 28.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving group physical downlink control channel signaling that configures configured grant uplink transmissions for a plurality of UEs that includes the UE and indicates a field within a group common physical control channel that the UE of the plurality of UEs is to monitor;

receiving a control message in the field within the group common physical control channel based at least in part on the received group physical downlink control channel signaling, wherein the control message comprises an indication for a hybrid automatic repeat request (HARQ) process; and transmitting a configured grant uplink transmission in accordance with the group physical downlink control channel signaling and the control message included in the field within the group common physical control channel.

2. The method of claim 1, wherein receiving the control message comprises:

receiving the control message that specifies an operation for the HARQ process corresponding to the configured grant uplink transmission, wherein the configured grant uplink transmission is transmitted in accordance with the specified operation.

3. The method of claim 1, further comprising:

receiving an acknowledgment message in the group common physical control channel based at least in part on the configured grant uplink transmission; and determining not to transmit a retransmission of the configured grant uplink transmission based at least in part on the acknowledgment message.

4. The method of claim 1, further comprising:

receiving an activate message in the group common physical control channel indicating that configured grant uplink transmission resources are active.

5. The method of claim 1, further comprising:

receiving a deactivate message in the group common physical control channel indicating that configured grant uplink transmission resources are inactive.

6. The method of claim 1, further comprising:

receiving a negative acknowledgment message in the group common physical control channel based at least in part on the configured grant uplink transmission; and transmitting a retransmission of the configured grant uplink transmission based at least in part on the negative acknowledgment message.

7. The method of claim 1, further comprising:

applying an input to a hash function to identify the field within the group common physical control channel; and decoding the field to obtain the control message.

8. The method of claim 7, wherein the input is a slot index associated with the configured grant uplink transmission, or a transmission time of the configured grant uplink transmission, or an identifier of the UE, or an identifier of a HARQ process, or any combination thereof.

9. The method of claim 1, further comprising:

applying an identifier of a first HARQ process to a hash function to identify a first field within the group common physical control channel; and applying an identifier of a second HARQ process to the hash function to identify a second field within the group common physical control channel.

10. The method of claim 9, further comprising:

receiving an acknowledgment message or a negative acknowledgment message corresponding to the configured grant uplink transmission in the first field; and receiving the acknowledgment message or the negative acknowledgment message in the second field corresponding to a second configured grant uplink transmission.

11. The method of claim 1, further comprising:

receiving an ignore message in the group common physical control channel indicating to ignore the group common physical control channel.

12. A method for wireless communication at a network device, comprising:

transmitting group physical downlink control channel signaling that configures configured grant uplink transmissions for a plurality of user equipments (UEs) and indicates a field within a group common physical control channel that the plurality of UEs is to monitor;

transmitting a control message in the field within the group common physical control channel based at least in part on the transmitted group physical downlink control channel signaling, wherein the control message comprises an indication for a hybrid automatic repeat request (HARQ) process; and receiving a configured grant uplink transmission in accordance with the group physical downlink control channel signaling and the control message included in the field within the group common physical control channel.

13. The method of claim 12, wherein transmitting the control message comprises:

transmitting the control message that specifies an operation for the HARQ process corresponding to the configured grant uplink transmission, wherein the configured grant uplink transmission is received in accordance with the specified operation.

14. The method of claim 12, further comprising:

transmitting an acknowledgment message in the group common physical control channel based at least in part on the configured grant uplink transmission.

15. The method of claim 12, further comprising:

transmitting an activate message in the group common physical control channel indicating that configured grant uplink transmission resources are active.

16. The method of claim 12, further comprising:

transmitting a deactivate message in the group common physical control channel indicating that configured grant uplink transmission resources are inactive.

17. The method of claim 12, further comprising:

transmitting an ignore message in the group common physical control channel indicating to ignore the group common physical control channel.

18. The method of claim 12, further comprising:

transmitting a negative acknowledgment message in the group common physical control channel based at least in part on the configured grant uplink transmission; and receiving a retransmission of the configured grant uplink transmission based at least in part on the negative acknowledgment message.

19. The method of claim 12, further comprising:

applying an input to a hash function to identify the field within the group common physical control channel; and transmitting the control message in the field.

20. The method of claim 19, wherein the input is a slot index associated with the configured grant uplink transmission, or a transmission time of the configured grant uplink transmission, or an identifier of a UE, or an identifier of a HARQ process, or any combination thereof.

21. The method of claim 12, further comprising:

applying an identifier of a first HARQ process to a hash function to identify a first field within the group common physical control channel; and applying an identifier of a second HARQ process to the hash function to identify a second field within the group common physical control channel.

22. The method of claim 21, further comprising:
transmitting an acknowledgment message or a negative acknowledgment message corresponding to the configured grant uplink transmission in the first field; and
transmitting the acknowledgment message or the negative acknowledgment message in the second field corresponding to a second configured grant uplink transmission.

23. The method of claim 12, further comprising:
configuring a first UE of the plurality of UEs and a second UE of the plurality of UEs to monitor the field within the group common physical control channel.

24. The method of claim 23, further comprising:
receiving a second configured grant uplink transmission from the second UE within a time period in which the configured grant uplink transmission is received from the first UE;
determining that the field of the group common physical control channel is jointly assigned to provide feedback to each of the first UE and the second UE; and
transmitting an acknowledgment message or a negative acknowledgment message based at least in part on whether decoding of the configured grant uplink transmission and the second configured grant uplink transmission is successful.

25. An apparatus for wireless communication at a user equipment (UE), comprising:
a processor,
memory in electronic communication with the processor; and
instructions stored in the memory and executable by the processor to cause the apparatus to:
receive group physical downlink control channel signaling that configures configured grant uplink transmissions for a plurality of UEs that includes the UE and indicates a field within a group common physical control channel that the UE of the plurality of UEs is to monitor;
receive a control message in the field within the group common physical control channel based at least in part on the received group physical downlink control channel signaling, wherein the control message comprises an indication for a hybrid automatic repeat request (HARQ) process; and
transmit a configured grant uplink transmission in accordance with the group physical downlink control channel signaling and the control message included in the field within the group common physical control channel.

26. An apparatus for wireless communication at a network device, comprising:
a processor,
memory in electronic communication with the processor; and
instructions stored in the memory and executable by the processor to cause the apparatus to:
transmit group physical downlink control channel signaling that configures configured grant uplink transmissions for a plurality of user equipments (UEs) and indicates a field within a group common physical control channel that the plurality of UEs is to monitor;
transmit a control message in the field within the group common physical control channel based at least in part on the transmitted group physical downlink control channel signaling, wherein the control message comprises an indication for a hybrid automatic repeat request (HARQ) process; and
receive a configured grant uplink transmission in accordance with the group physical downlink control channel signaling and the control message included in the field within the group common physical control channel.

* * * * *